(12) United States Patent
Bui et al.

(10) Patent No.: US 10,102,873 B2
(45) Date of Patent: Oct. 16, 2018

(54) BALANCED DELAY AND RESOLUTION FOR HIGH DENSITY SERVO SYSTEMS

(71) Applicant: International Business Machines Corporation, Armonk, NY (US)

(72) Inventors: Nhan X. Bui, Tucson, AZ (US); Giovanni Cherubini, Rueschlikon (CH); Simeon Furrer, Altdorf (CH); Mark A. Lantz, Adliswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/439,790

(22) Filed: Feb. 22, 2017

(65) Prior Publication Data
US 2018/0240485 A1 Aug. 23, 2018

(51) Int. Cl.
G11B 5/584 (2006.01)
G11B 5/592 (2006.01)

(52) U.S. Cl.
CPC ............... *G11B 5/5926* (2013.01)

(58) Field of Classification Search
None
See application file for complete search history.

(56) References Cited

U.S. PATENT DOCUMENTS

| | | | |
|---|---|---|---|
| 5,291,348 A * | 3/1994 | Copolillo | G11B 5/00817 360/77.07 |
| 5,309,299 A | 5/1994 | Crossland et al. | |
| 5,629,813 A | 5/1997 | Baca et al. | |
| 6,021,013 A | 2/2000 | Albrecht et al. | |
| 6,111,719 A * | 8/2000 | Fasen | G11B 15/52 360/73.04 |
| 6,831,805 B2 | 12/2004 | Chliwnyj et al. | |
| 6,873,487 B2 | 3/2005 | Molstad | |
| 6,940,682 B2 * | 9/2005 | Bui | G11B 5/584 360/77.12 |
| 7,245,450 B1 | 7/2007 | Cherubini et al. | |
| 7,393,066 B2 | 7/2008 | Dugas et al. | |
| 7,411,759 B2 | 8/2008 | Trabert et al. | |

(Continued)

FOREIGN PATENT DOCUMENTS

EP 923078 A1 6/1999

OTHER PUBLICATIONS

Bui et al., U.S. Appl. No. 15/439,760, filed Feb. 22, 2017.
List of IBM Patents or Patent Applications Treated As Related.
Pantazi, et al., "Nanoscale track-following for tape storage," 2015 American Control Conference (ACC), pp. 2837-2843, IEEE, 2015.

(Continued)

*Primary Examiner* — K. Wong
(74) *Attorney, Agent, or Firm* — Zilka-Kotab, P.C.

(57) ABSTRACT

A tape drive-implemented method, according to another embodiment, includes: determining a length of a window of a servo pattern to use for calculating a lateral position estimate, determining a number of the windows of the servo pattern to use for calculating a lateral position value, receiving signals corresponding to each of the number of the windows of the servo pattern from a single servo channel, calculating a lateral position estimate for each of the number of the windows of the servo pattern, calculating the lateral position value by using the lateral position estimates, and using the lateral position value to control a tape head actuator. Other systems, methods, and computer program products are described in additional embodiments.

20 Claims, 12 Drawing Sheets

(56) References Cited

U.S. PATENT DOCUMENTS

| | | | |
|---|---|---|---|
| 7,903,368 B2* | 3/2011 | Bui | G11B 5/584 360/48 |
| 8,139,312 B2* | 3/2012 | Bui | G11B 5/584 360/77.12 |
| 8,422,162 B2 | 4/2013 | Cherubini et al. | |
| 8,891,199 B2 | 11/2014 | Cherubini et al. | |
| 9,058,828 B1* | 6/2015 | Cherubini | G11B 5/584 |
| 9,251,827 B2 | 2/2016 | Cherubini et al. | |
| 9,524,741 B1* | 12/2016 | Cherubini | G11B 5/584 |
| 2004/0265635 A1 | 12/2004 | Ishiguro | |
| 2008/0144211 A1 | 6/2008 | Weber et al. | |
| 2011/0228421 A1 | 9/2011 | Watanabe | |
| 2018/0240484 A1 | 8/2018 | Bui et al. | |

OTHER PUBLICATIONS

Cherubini et al., "High-Performance Servo Channel for Nanometer Head Positioning and Longitudinal Position Symbol Detection in Tape Systems," IEEE/ASME Transactions on Mechatronics, vol. 21, No. 2, Apr. 2016, pp. 1116-1128.

Ultrium LTO, "Why LTO Technology," Oct. 27, 2016, pp. 4, Retrieved From http://www.lto.org/.

Furrer et al., "Resolution Limits of Timing-Based Servo Schemes in Magnetic Tape Drives," IEEE Transactions on Magnetics, vol. 51, No. 11, Nov. 2015, pp. 1-4.

Lantz et al., "Servo-Pattern Design and Track-Following Control for Nanometer Head Positioning on Flexible Tape Media," IEEE Transactions on Control System Technology, vol. 20, No. 2, Mar. 2012, pp. 369-381.

Non-Final Office Action from U.S. Appl. No. 15/439,760, dated Jun. 15, 2017.

Final Office Action from U.S. Appl. No. 15/439,760, dated Nov. 29, 2017.

Notice of Allowance from U.S. Appl. No. 15/439,760, dated Jun. 6, 2018.

Notice of Allowance from U.S. Appl. No. 15/439,760, dated Jul. 19, 2018.

Bui et al., U.S. Appl. No. 16/045,610, filed Jul. 25, 2018.

Bui et al., U.S. Appl. No. 16/046,905, filed Jul. 26, 2018.

* cited by examiner

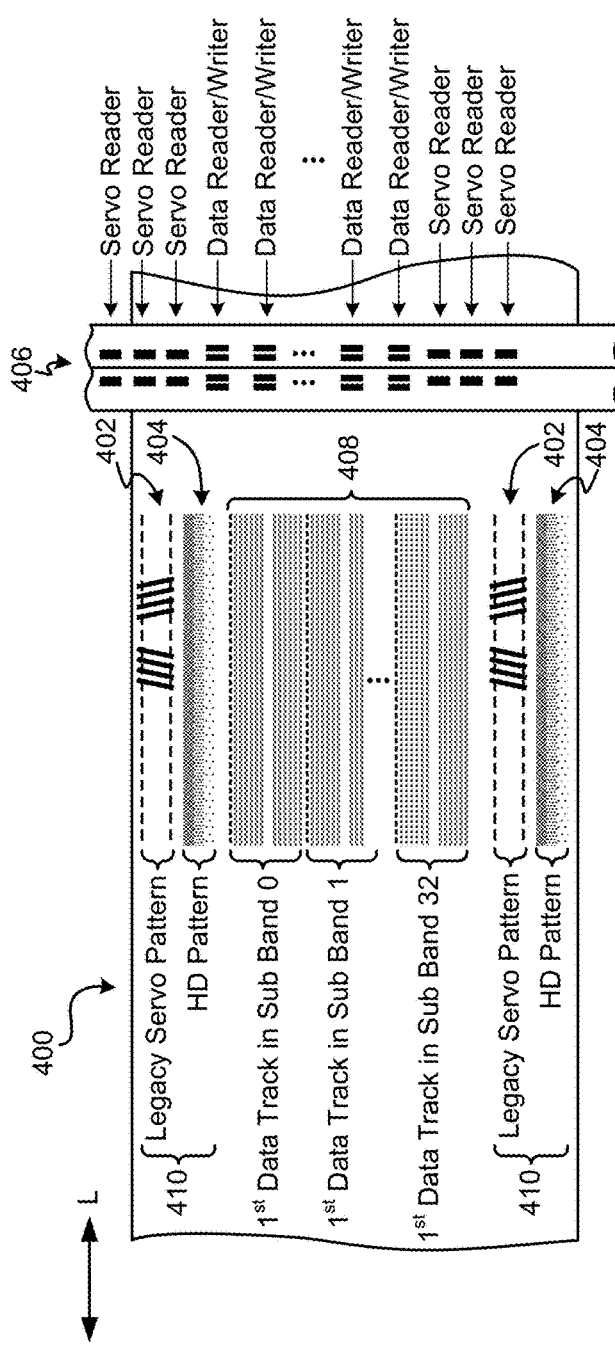
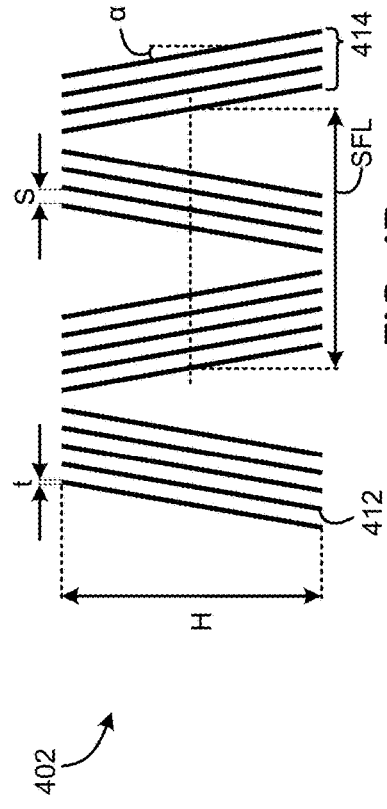
FIG. 4A
FIG. 4B

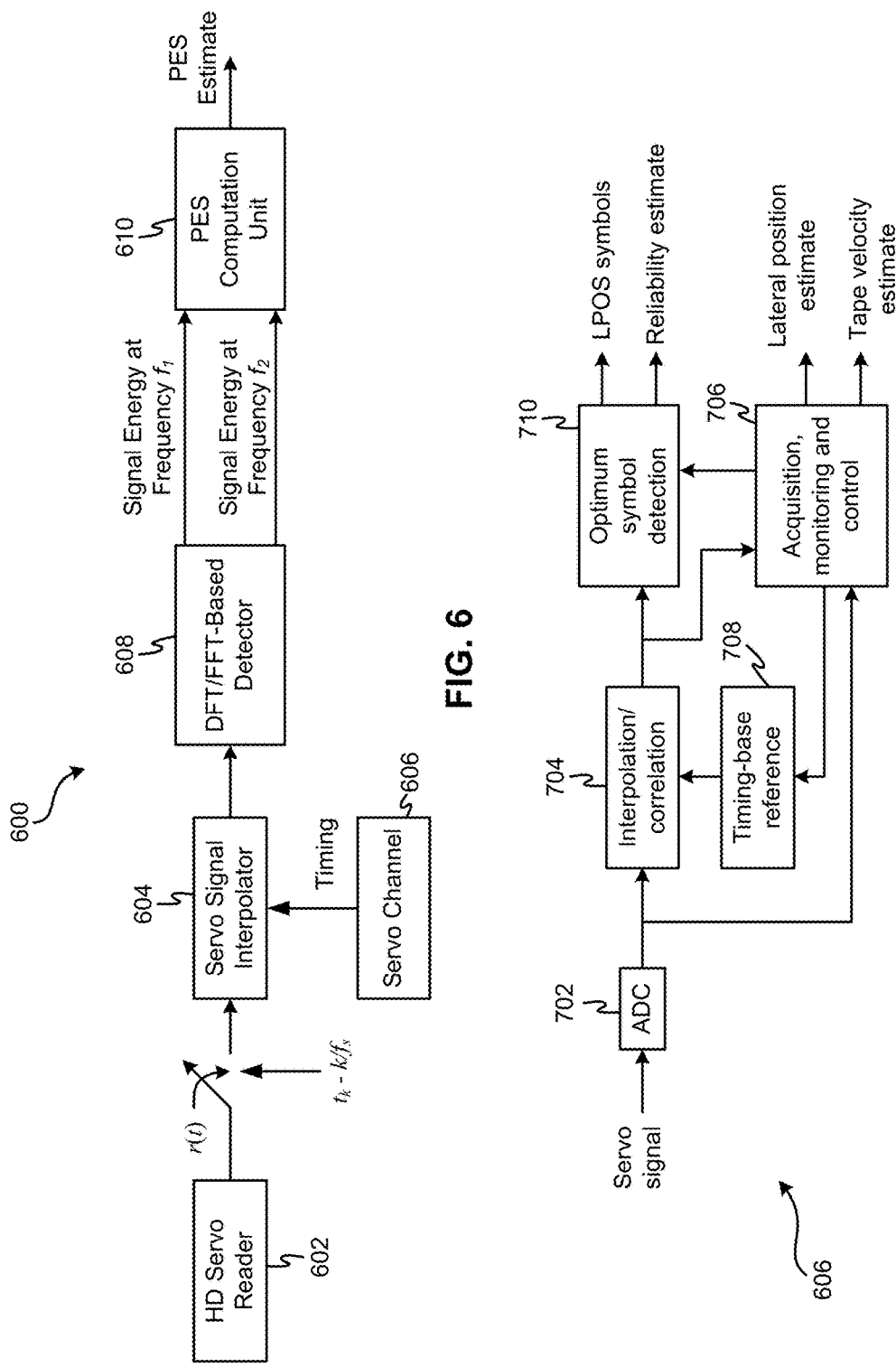

1200

| speed index $s_i$ | number of lateral position estimates to use $c_i$ |
|---|---|
| $s_1$ | $c_1 = 1$ |
| $s_2$ | $c_2 = 1$ |
| $s_3$ | $c_3 = 2$ |
| $s_4$ | $c_4 = 3$ |
| ⋮ | ⋮ |

$s_i \longrightarrow$ [table] $\longrightarrow c_i$

| speed index $s_i$ | window length $D_w$ | number of lateral position estimates to use $c_i$ |
|---|---|---|
| $s_1$ | $D_{w1}$ | $c_1 = 1$ |
| $s_2$ | $D_{w1}$ | $c_2 = 1$ |
| $s_3$ | $D_{w2}$ | $c_3 = 2$ |
| $s_4$ | $D_{w2}$ | $c_4 = 3$ |
| ⋮ | ⋮ | ⋮ |

$s_i \longrightarrow$ [table] $\longrightarrow D_w, c_i$

FIG. 13

BALANCED DELAY AND RESOLUTION FOR HIGH DENSITY SERVO SYSTEMS

BACKGROUND

The present invention relates to tape storage systems, and more specifically, to using high density servo information to determine the position of a read/write head relative to a magnetic medium.

Timing-based servo (TBS) is a technology which was developed for linear tape drives in the late 1990s. In TBS systems, recorded servo patterns include transitions with two different azimuthal slopes, thereby forming a chevron-type pattern. These patterned transitions allow for an estimate of the head lateral position to be determined by evaluating the relative timing of pulses generated by a servo reader reading the patterns as they are passed over the servo reader.

In a TBS format, the servo pattern is prerecorded in several bands distributed across the tape. Typically, five or nine servo pattern bands are included on a given tape which run about parallel to a longitudinal axis of the tape. Data is recorded in the regions of tape located between pairs of the servo bands. In read/write heads of IBM linear tape-open (LTO) and Enterprise tape drives, two servo readers are normally available per head module, from which longitudinal position (LPOS) information as well as a position error signal (PES) may be derived. Effective detection of the TBS patterns is achieved by a synchronous servo channel employing a matched-filter interpolator/correlator, which ensures desirable filtering of the servo reader signal.

With the increase in track density that is envisioned for future tape media and tape drives, accurately controlling the lateral position of the head and/or skew of the head with respect to tape by using feedback generated by reading the TBS patterns becomes increasingly difficult. Conventional servo based implementations may not be sufficiently accurate to ensure adequate positioning of the data readers and writers that move along data tracks. Furthermore, the repetition rate of the head lateral position estimates may be too low to ensure proper track-following operation as tape velocity varies during use. The repetition rate of the head lateral position estimates may additionally be unable to support future actuators with larger bandwidths. Therefore it is desirable to achieve head lateral position estimates at both a repetition rate and an accuracy that ensures proper track-following operation even at low tape velocities and with large-bandwidth actuators.

Some magnetic tapes may further be augmented with additional features that provide additional functionality. Accordingly, high density (HD) servo patterns may be implemented in place of, or in addition to, the standard TBS servo patterns.

SUMMARY

A tape drive-implemented method, according to one embodiment, includes: determining a length of a window of a servo pattern to use for calculating a lateral position estimate, determining a number of the windows of the servo pattern to use for calculating a lateral position value, receiving signals corresponding to each of the number of the windows of the servo pattern from a single servo channel, calculating a lateral position estimate for each of the number of the windows of the servo pattern, calculating the lateral position value by using the lateral position estimates, and using the lateral position value to control a tape head actuator.

A computer program product, according to another embodiment, includes a computer readable storage medium having program instructions embodied therewith, the program instructions executable by a processor to cause the processor to: determine, by the processor, a length of a window of a servo pattern to use for calculating a lateral position estimate, determine, by the processor, a number of the windows of the servo pattern to use for calculating a lateral position value, receive, by the processor, signals corresponding to each of the number of the windows of the servo pattern from a single servo channel, calculate, by the processor, a lateral position estimate for each of the number of the windows of the servo pattern, calculate, by the processor, the lateral position value by using the lateral position estimates, and use, by the processor, the lateral position value to control a tape head actuator.

A tape drive, according to yet another embodiment, includes: a controller comprising logic integrated with and/or executable by the controller to cause the controller to: determine a length of a window of a servo pattern to use for calculating a lateral position estimate, determine a number of the windows of the servo pattern to use for calculating a lateral position value, receive signals corresponding to each of the number of the windows of the servo pattern from a single servo channel, calculate a lateral position estimate for each of the number of the windows of the servo pattern, calculate the lateral position value by using the lateral position estimates, and use the lateral position value to control a tape head actuator.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 4A is a hybrid servo pattern written in a dedicated area of a tape medium, according to one embodiment.

FIG. 4B is a partial detailed view of a TBS pattern, according to one embodiment.

FIG. 6 is a block diagram of a detector for HD patterns, according to one embodiment.

FIG. 7 is a partial block diagram of a servo channel for TBS patterns, according to one embodiment.

FIG. 12 is a representative view of a lookup table, according to one embodiment.

FIG. 13 is a representative view of a lookup table, according to one embodiment.

DETAILED DESCRIPTION

Figure 1:
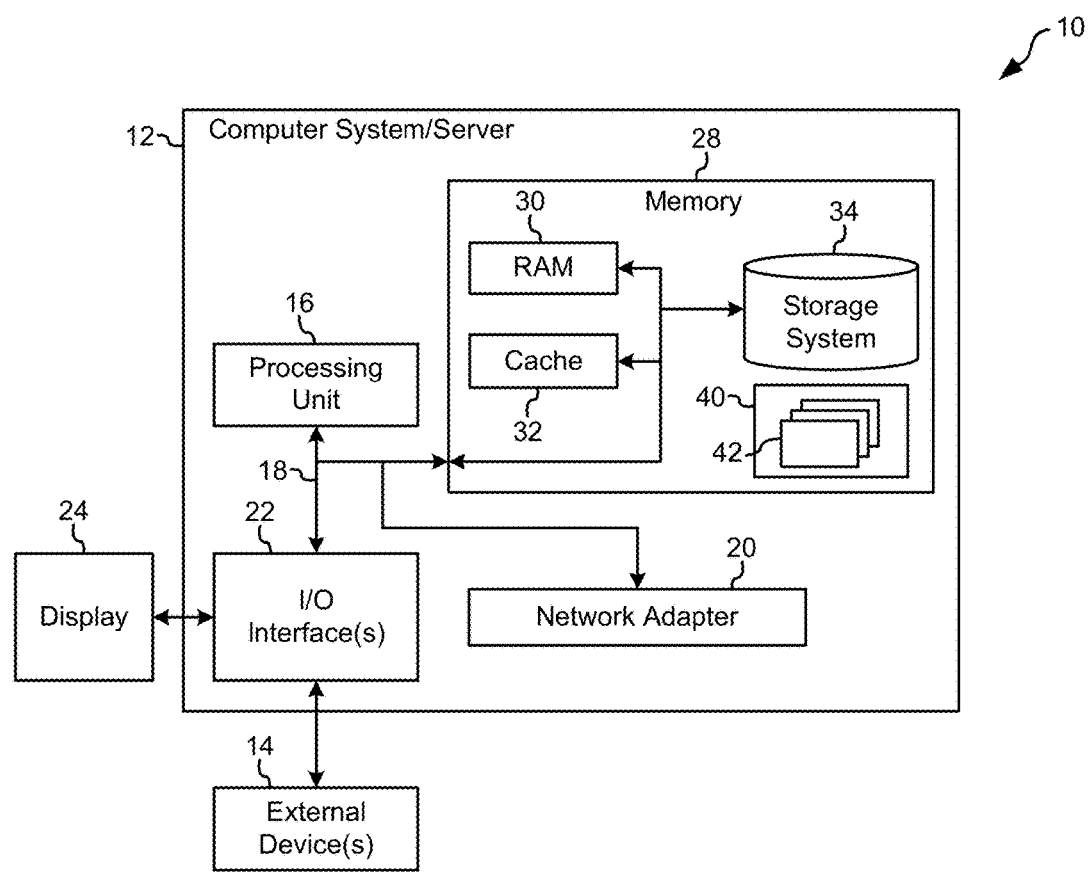
FIG. 1 illustrates a network storage system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof for improved position estimation performance using windows of HD servo pattern information from magnetic tape. Accordingly, some of the embodiments described herein successfully improve the accuracy by which the position of a tape head may be estimated compared to what has been previously achievable. By combining a number of servo estimates read from one or more HD servo tracks by one or more servo readers, a more accurate position estimation of the tape head may be achieved. However, a trade-off between accuracy (resolution) of the position, delay, and spatial frequency resolution may exist in the various embodiments described herein, as will be described in further detail below.

In one general embodiment, a tape drive-implemented method includes: determining a length of a window of a servo pattern to use for calculating a lateral position estimate, determining a number of the windows of the servo pattern to use for calculating a lateral position value, receiving signals corresponding to each of the number of the windows of the servo pattern from a single servo channel, calculating a lateral position estimate for each of the windows of the servo pattern, calculating the lateral position value by using the lateral position estimates, and using the lateral position value to control a tape head actuator.

In another general embodiment, a computer program product includes a computer readable storage medium having program instructions embodied therewith, the program instructions executable by a processor to cause the processor to: determine, by the processor, a length of a window of a servo pattern to use for calculating a lateral position estimate, determine, by the processor, a number of the windows of the servo pattern to use for calculating a lateral position value, receive, by the processor, signals corresponding to each of the number of the windows of the servo pattern from a single servo channel, calculate, by the processor, a lateral position estimate for each of the number of the windows of the servo pattern, calculate, by the processor, the lateral position value by using the lateral position estimates, and use, by the processor, the lateral position value to control a tape head actuator.

In another general embodiment, a tape drive includes: a controller comprising logic integrated with and/or executable by the controller to cause the controller to: determine a length of a window of a servo pattern to use for calculating a lateral position estimate, determine a number of the windows of the servo pattern to use for calculating a lateral position value, receive signals corresponding to each of the number of the windows of the servo pattern from a single servo channel, calculate a lateral position estimate for each of the number of the windows of the servo pattern, calculate the lateral position value by using the lateral position estimates, and use the lateral position value to control a tape head actuator.

Referring now to FIG. 1, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth herein.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the network storage system 10 is shown in the form of a general-purpose computing device. The components of computer system/server 12 may include, but are not limited to, one or more processors or processing units 16, a system memory 28, and a bus 18 that couples various system components including system memory 28 which is coupled to processor 16.

Bus 18 represents one or more of any of several types of bus structures, including a memory bus or memory controller, a peripheral bus, an accelerated graphics port, a processor or local bus using any of a variety of bus architectures, etc. By way of example, which is in no way intended to limit the invention, such architectures include Industry Standard Architecture (ISA) bus, Micro Channel Architecture (MCA)

bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and may include both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a hard disk drive (HDD). Although not shown, a magnetic disk drive for reading from and writing to a removable, non-volatile magnetic disk (e.g., a "floppy disk"), and an optical disk drive for reading from or writing to a removable, non-volatile optical disk such as a compact disc read-only memory (CD-ROM), digital versatile disc-read only memory (DVD-ROM) or other optical media may be provided. In such instances, each disk drive may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, program data, etc. Each of the operating system, one or more application programs, other program modules, and program data or some combination thereof, may include an implementation of a networking environment. It should also be noted that program modules 42 may be used to perform the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, data archival storage systems, etc.

Figure 2:
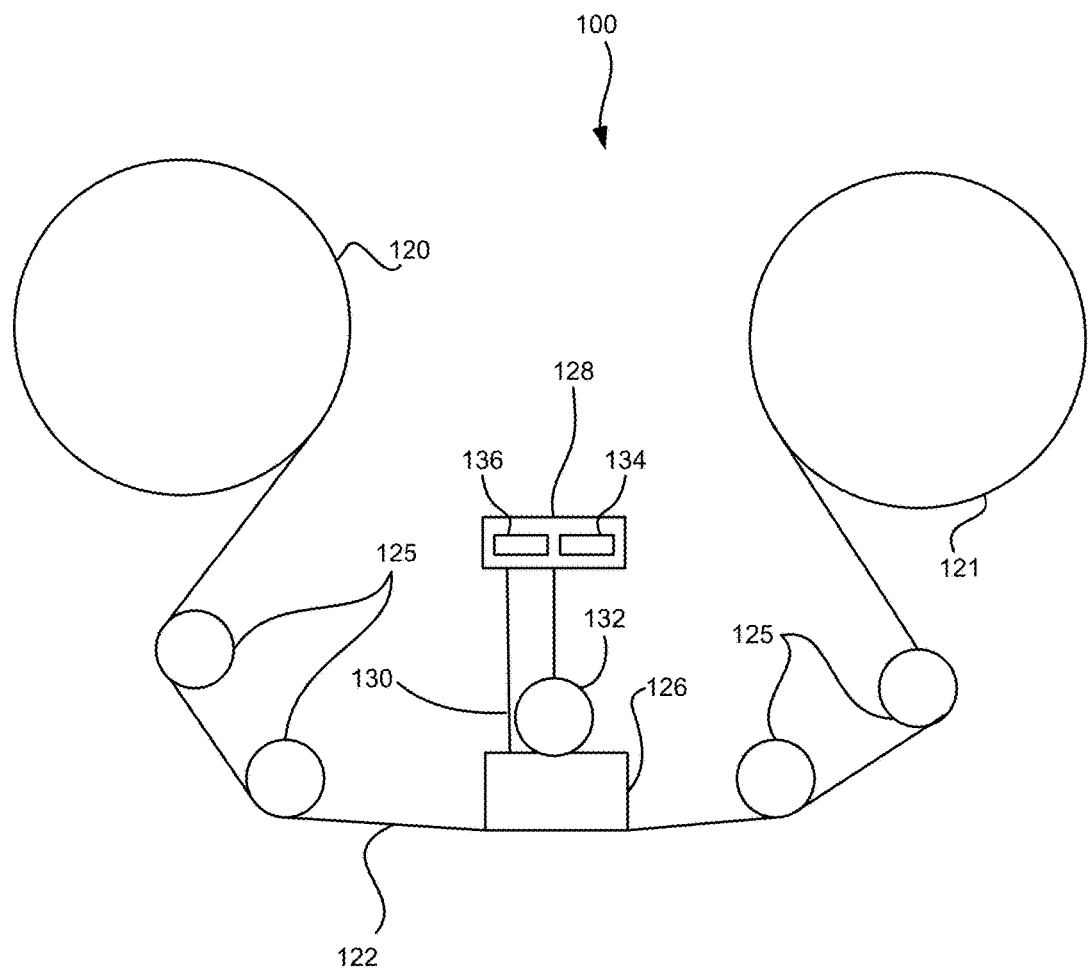
FIG. 2 illustrates a simplified tape drive of a tape-based data storage system, according to one embodiment.

Looking to FIG. 2, a tape supply cartridge 120 and a take-up reel 121 are provided to support a tape 122. One or more of the reels may form part of a removable cartridge and are not necessarily part of the tape drive 100. A tape drive, e.g., such as that illustrated in FIG. 2, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 may control head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein according to various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 3:
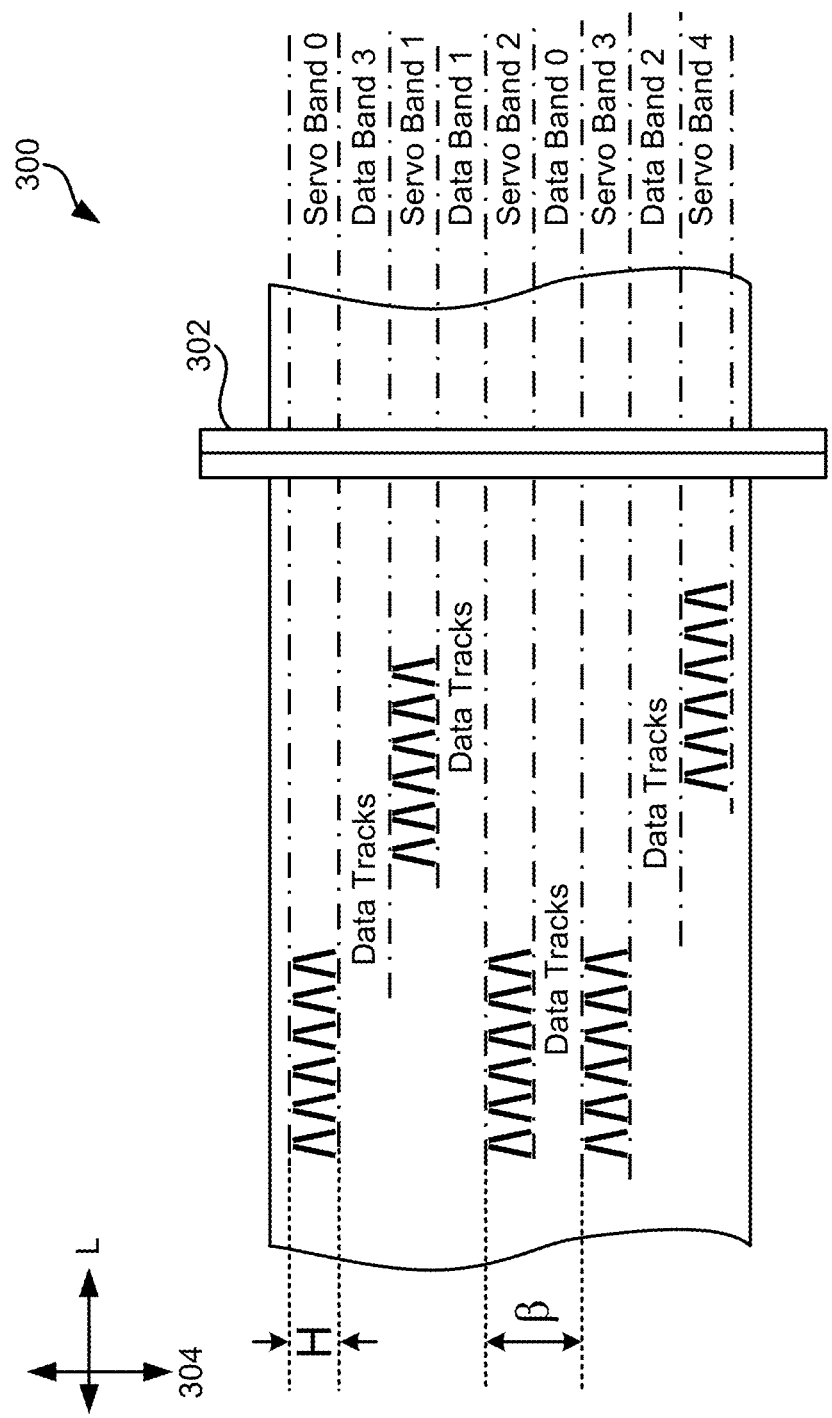
FIG. 3 illustrates a tape layout, according to one embodiment.

Referring momentarily to FIG. 3, an illustrative tape layout is depicted in accordance with one embodiment. As shown, tape 300 has a tape layout which implements five servo bands Servo Band 0-Servo Band 4, and four data bands Data Band 0-Data Band 3, as specified in the LTO format and IBM Enterprise format. The height H of each of the servo bands is measured in the cross-track direction 304 which is about orthogonal to the length L of the tape 300. According to an example, the height H of each of the servo bands may be about 186 microns according to the LTO format. Moreover, a pitch $\beta$ between the servo bands as shown may be about 2859 microns, again according to the LTO format.

An exemplary tape head 302 is also shown as having two modules and as being positioned over a portion of the tape 300 according to one approach. Read and/or write transducers may be positioned on either module of the tape head 302 according to any of the approaches described herein, and may be used to read data from and/or write data to the data bands. Furthermore, tape head 302 may include servo readers which may be used to read the servo patterns in the servo bands according to any of the approaches described herein. It should also be noted that the dimensions of the various components included in FIG. 3 are presented by way of example only and are in no way intended to be limiting.

Some tape drives are configured to operate at low tape velocities and/or with nanometer head position requirements. These tape drives may use servo formats that target Barium Ferrite (BaFe) tape media, 4 or 8 data bands, 32 or 64 data channel operation, allow very low velocity operation, support large-bandwidth actuator operation, and improve parameter estimation to minimize standard deviation of the position error signal (PES), thus enabling track-density scaling for tape cartridge capacities up to 100 TB and beyond.

However, according to some embodiments, magnetic tape may further be augmented with additional features that provide additional functionality. Accordingly, HD servo patterns may be implemented in place of the standard TBS servo patterns, e.g., as seen in FIG. 3. The HD servo patterns may be used to improve track-following performance.

In still further embodiments, a standard TBS servo pattern (e.g., as shown in FIG. 3) may be implemented in combination with one or more HD servo patterns (e.g., see FIG. 4A below). One implementation includes a hybrid servo pattern scheme, in which a standard TBS pattern is retained and additional HD patterns are provided in a dedicated, preferably currently unused area of the tape media. This type of pattern may be implemented by increasing the number of data channels from 16 to 32, and reducing the width of the TBS pattern from 186 microns to 93 microns, in some approaches.

A hybrid servo pattern 410, which includes a standard TBS pattern 402 written in a servo track, as well as an HD pattern 404 that is written in a track (e.g., dedicated area) of the tape medium 408 is shown in FIG. 4A. In some approaches, significant features of the original TBS pattern 402 are retained, such as a servo frame structure consisting of four servo bursts containing a number of servo stripes, where the servo stripes of adjacent servo bursts are written with alternating azimuthal angle. Other parameters of legacy servo patterns, such as the servo pattern height and other geometric dimensions, as well as the number of servo stripes per burst, may be modified as desired.

The HD pattern 404 may include periodic waveforms of various frequencies alternately written in the length direction L along a longitudinal axis of the tape. The standard TBS pattern 402 may be used to provide initial identification of the servo band (e.g., by providing a servo band ID); initial positioning of the head 406 on an appropriate servo location; acquisition of initial servo channel parameters, such as tape velocity, lateral head position, head-to-tape skew, LPOS information, etc.; etc. Moreover, the HD pattern 404 may enable more accurate and more frequent estimates of servo channel parameters, thereby achieving improved head positioning at a much wider range of tape velocities and support for larger bandwidth head actuation. As such, track-density scaling may be enabled for very large cartridge capacities, as well as improved data rate scaling with host computer requirements through the support of a wider velocity range.

The detection of the periodic waveforms forming a HD pattern may be obtained by a detector that implements a complex algorithmic conversion, e.g., such as a Discrete Fourier Transform (DFT), a Fast Fourier Transform (FFT), etc. However, this implementation complexity may reduce the flexibility in trade-offs between the rate of generation of servo reader lateral position estimates and the standard deviation of the estimation error. Accordingly, components (e.g., controllers) with high throughput may desirably be used to process signals derived from a HD pattern in order to reduce the processing time thereof.

In one embodiment, a detector capable of reading a hybrid of TBS and HD patterns may be implemented. The hybrid detector may be configured to obtain estimates of the energy of relevant spectral frequency components in a readback signal from the HD pattern, while also calculating estimates of the lateral position of the head based on these energies, without applying a DFT or a FFT.

The tape layout 400 of FIG. 4A includes a hybrid servo pattern 410 according to one embodiment, in the hybrid servo pattern 410, an HD pattern 404 is written in a space adjacent to a standard TBS pattern 402. Three servo readers Servo Reader are assigned to each hybrid servo pattern 410 (e.g., servo band). According to the present embodiment, quadrature sequences are not included due to the use of the TBS pattern 402, which is converse to products implementing servo functionality in hard-disk drives.

Looking momentarily to FIG. 4B, a partial detailed view of a TBS pattern 402 (e.g., a TBS frame) is illustrated according to an exemplary embodiment. As shown, a plurality of servo stripes 412 together form a servo burst 414, while corresponding pairs of servo bursts 414 form servo sub-frames. In the present embodiment, the servo bursts 414 included in the left servo sub-frame each have five servo stripes 412, while the servo bursts 414 included in the right servo sub-frame each have four servo stripes 412. The servo stripes 412 included in a given servo burst 414 are oriented such that they have a same azimuthal slope represented by angle α. Moreover, corresponding pairs of servo bursts 414 have opposing azimuthal slopes, thereby forming a chevron-type pattern. The height H and thickness t of the servo stripes 412 may vary depending on the servo writer used to write the TBS pattern 402. According to an exemplary approach, which is in no way intended to limit the invention, the height H may be about 186 μm, and the angle α may be about 6°, while the thickness t is about 2.1 μm. Moreover, the spacing S between each of the servo stripes 412 and/or the sub-frame length SFL between servo bursts 414 having the same azimuthal slope may vary depending on the desired embodiment. According to an exemplary approach, which is in no way intended to limit the invention, the spacing S may be about 5 μm, while the sub-frame length SFL is about 100 μm. As described above, patterned transitions such as that shown in FIG. 4B allow for an estimate of the head lateral position to be determined by evaluating the relative timing of pulses generated by a servo reader reading the servo stripes 412 of the servo burst 414 as they are passed over the servo reader.

Referring again to FIG. 4A, the HD pattern 404 of FIG. 4A may include periodic waveforms written on adjacent tracks. For example, two periodic waveforms, characterized by two different spatial frequencies: low-frequency $f_1$ and high-frequency $f_2$, where $f_2 > f_1$. However, a wider range of lateral head displacement is desired. Accordingly, a different configuration of the HD patterns may be used to avoid ambiguity in determining the lateral displacement.

Figure 5C:
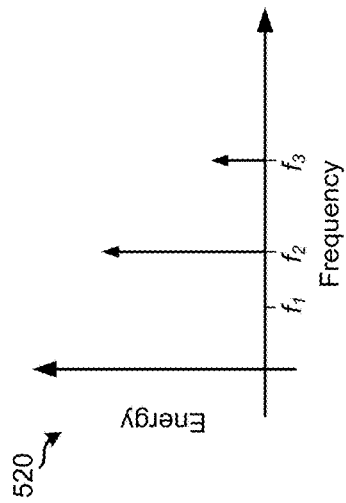
FIG. 5C is a HD pattern, according to one embodiment.

An HD servo pattern preferably includes periodic waveforms of differing frequencies alternately written in the lateral (cross-track) direction. Accordingly, HD servo patterns may be able to desirably provide more accurate and/or more frequent estimates of servo channel parameters according to various embodiments described herein. Looking to FIGS. 5A-5D, an HD pattern 500 is shown that overcomes the limited range of lateral head displacement associated with an HD pattern having only two periodic waveforms, characterized by two different spatial frequencies. As shown in FIGS. 5A and 5C, at least three frequencies are used for the HD pattern 500 in adjacent tracks, which repeat periodically across the band where the HD pattern is written. In the embodiment of FIGS. 5A and 5C, the servo reader (denoted by the block labelled 'R') spans wider in the cross-track direction 502 than a single track, such that at least two tones are detected under any reading conditions at a given time when the servo reader R is positioned over the HD pattern 500. Looking specifically to FIG. 5A, the reader R spans across both the bottom portion 508 and middle portion 506 of the HD pattern 500. FIG. 5C illustrates an alternative position for the servo reader R, where the reader R spans across the upper portion 504 and middle portion 506 of the HD pattern 500.

The three portions 508, 506, 504 of the periodic waveforms are characterized by three different frequencies $f_1$, $f_2$, and $f_3$, respectively, where $f_3 > f_2 > f_1$. According to various approaches, each waveform may be characterized as having a number of periods in a range from about 25 to about 200, such as 30 periods, 50 periods, 75 periods, 100 periods, etc., within a predetermined spacing. More preferably, the predetermined spacing may be in a range from about 50 μm to about 150 μm, such as about 60 μm, about 75 μm, about 100 μm, etc., depending on the approach. Moreover, the symbol length may be in a range from about 0.5 μm to about 3.0 μm, e.g., such as about 1.0 μm, about 1.5 μm, about 2.0 μm, etc.

Hence, with continued reference to FIGS. 5A-5D, an edge of one of the portions of the HD pattern 500 may be distinguished from the edge of another of the portions. Looking specifically to FIG. 5A, an edge of the middle portion 506 may be distinguished from an edge of the bottom portion 508 by evaluating the signals read by the servo reader R, which overlaps both portions 506, 508. The graph 510 in FIG. 5B identifies the various frequencies in the readback signal from servo reader R and the energy level corresponding to each of the respective frequencies for the position of the servo reader R shown in FIG. 5A. Energy values may be determined in some approaches by integrating over a given amount of time (or distance along the tape). As shown in graph 510, in addition to the middle frequency $f_2$, the bottom frequency $f_1$ is present in the readback signal of the servo reader R and may thereby be detected by a spectral analysis. Furthermore, the energy values of the spectral components $f_1$ and $f_2$ represent the relation of the servo reader R overlapping the middle and bottom portions 506, 508. Given that the energy value of the spectral component of frequency $f_1$ is smaller than the energy value of the spectral component of the second frequency $f_2$, it follows that the servo reader R can be determined to be overlapped with the middle portion 506 more than it is overlapped with the bottom portion 508. Moreover, a comparison of the corresponding energies may be used to determine a fine position of the servo reader R with respect to a magnetic tape.

Figure 5D:
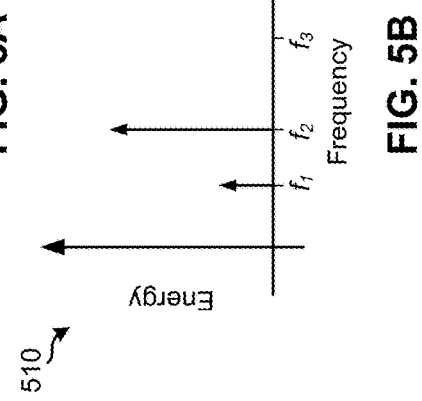
FIG. 5D is a graph plotting readback energy vs. frequency for the reader in FIG. 5C.
Figure 5A:
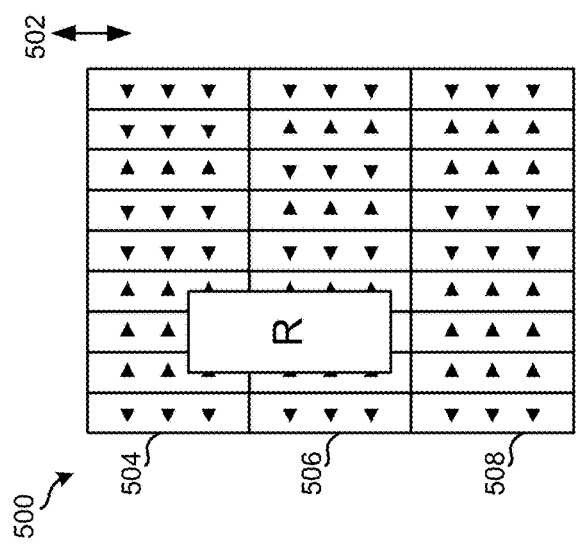
FIG. 5A is a HD pattern, according to one embodiment.
Figure 5B:
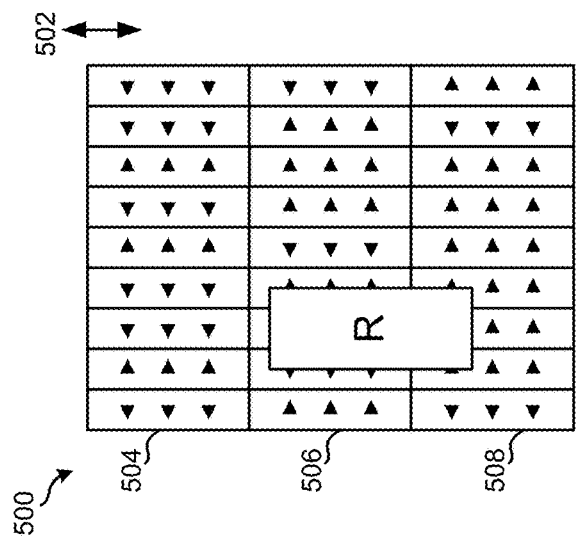
FIG. 5B is a graph plotting readback energy vs. frequency for the reader in FIG. 5A.

Similarly, the graph 520 in FIG. 5D identifies the frequencies in the readback signal from servo reader R positioned as shown in FIG. 5C, as well as the energy level corresponding to each of the respective frequencies. As shown, frequencies $f_2$, and $f_3$ are present in the readback signal of the servo reader R, and may be detected by a spectral analysis. Again, the energies of the spectral components for frequencies $f_2$, and $f_3$ indicate that the servo reader R is positioned above the upper and middle portions 504, 506. Given that the energy of the spectral component of frequency $f_3$ is smaller than the energy of the spectral component of frequency $f_2$, it follows that the servo reader R is overlapped with the middle portion 506 more than it is overlapped with the upper portion 504. Moreover, a comparison of the corresponding energy values may be used to determine a fine position of the servo reader R with respect to a magnetic tape.

Note that the waveform periods of the three frequencies may be integer multiples of a period T, for example T=241.3 nm, which corresponds to the highest spatial frequency, which is proportional to 1/T, when spectral estimation by a DFT/FFT-based detector with a minimum number of spectral bins for given integration interval is adopted.

FIG. 6 shows a block diagram of a DFT/FFT-based detector 600 configured for the computation of the PES from an HD servo pattern comprising periodic waveforms. The servo signal from the servo reader 602 is interpolated using a servo signal interpolator 604 with the timing information from a synchronous servo channel 606. The interpolated signal samples are then processed by either a DFT-based or a FFT-based (DFT/FFT-based) detector 608 that estimates the signal energy values at frequencies $f_1$ and $f_2$. The DFT/FFT-based detector 608 outputs are input to a PES computation unit 610, which determines a PES estimate by taking the difference of the signal energy values.

Ideally, the two periodic waveforms, whose energies are estimated by the DFT/FFT-based detector 608, are sinusoidal waveforms at frequencies $f_1$ and $f_2$. However, a DFT/FFT-based detector 608 when used for HD patterns has an inherent drawback where the number of spectral components, for which an estimate of the energy is provided, depends on the integration interval for the DFT (or FFT) computation, and may be very large when the integration interval extends over several periods of the fundamental frequency, as is typically the case when a low-noise estimation process is used.

Referring momentarily to FIG. 7, a servo channel 606 to extract servo information from TBS signals is illustrated according to an exemplary embodiment which is in no way intended to limit the invention. As shown, a servo signal is input to an analog-to-digital converter (ADC) 702 of the servo channel 606, which may in turn be provided to an interpolation/correlation module 704 and/or an acquisition, monitoring and control module 706. Moreover, an output from the timing-base reference 708 is also provided to the interpolation/correlation module 704. Acquisition, monitoring and control module 706 may output a lateral position estimate and/or a tape velocity estimate which may be further used, e.g., according to any of the approaches described herein. Furthermore, optimum signal detection module 710 may output LPOS symbols and/or a reliability estimate as shown.

Servo channel 606 may operate at a specific clock rate at which it samples the readback signal of a corresponding tape head. However, a processor which implements a controller capable of performing any one or more of the operations described below (e.g., with respect to methods 1100, 1400, 1500), may operate at a different clock rate.

As the number of periodic waveform components forming the readback signal of an HD pattern is usually limited to two or three for a given lateral position, it is advantageous to resort to a low-complexity implementation of the detector, whereby only estimates of the energy of the relevant spectral components at two or three frequencies in the readback signal of an HD pattern are efficiently computed.

Figure 8:
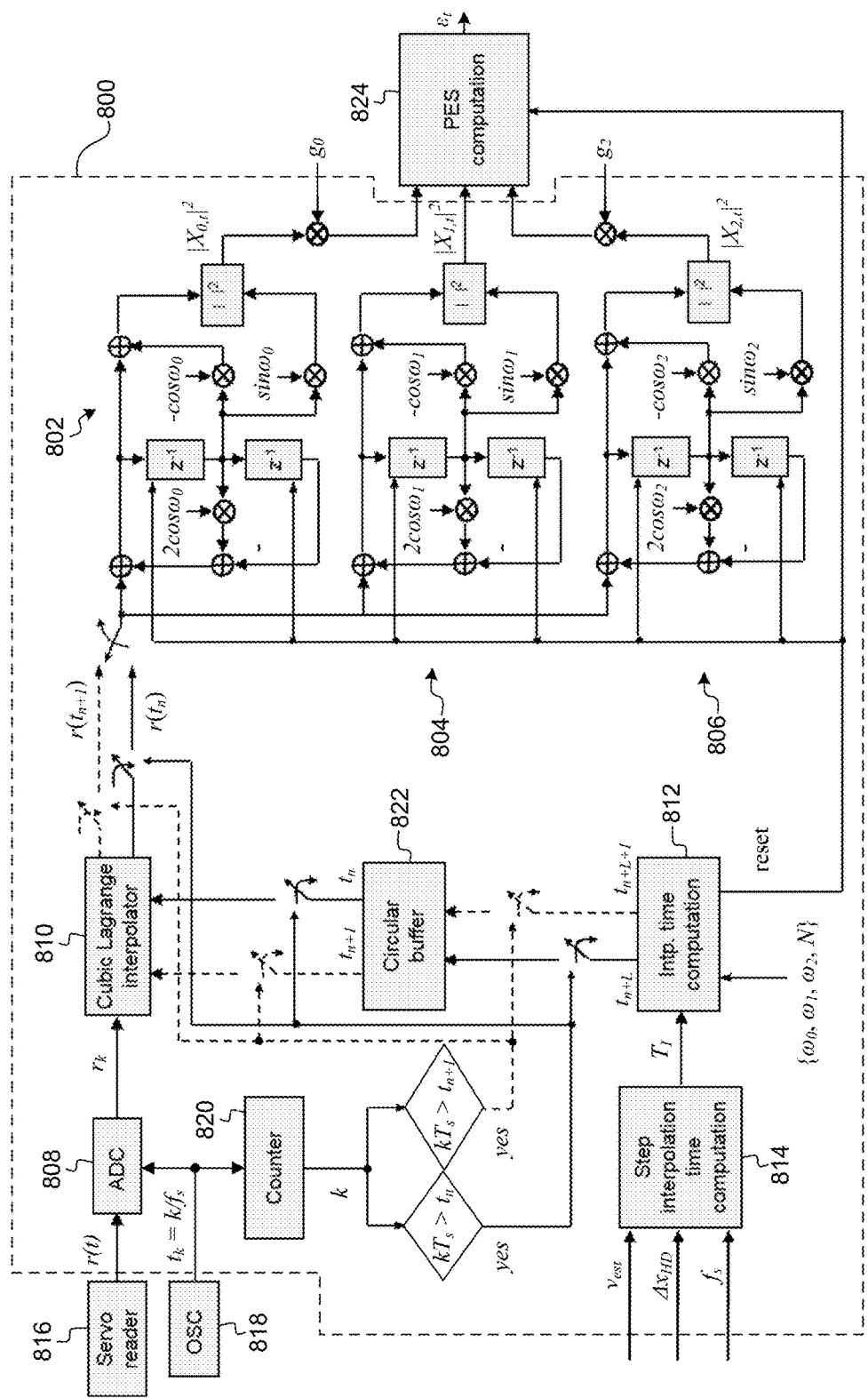
FIG. 8 is a block diagram of a detector for HD patterns, according to one embodiment.

Now looking to FIG. 8, a detector 800 for HD patterns is shown according to one embodiment. The detector 800 is configured to operate with periodic waveforms, which correspond to the components of the readback signal of an HD pattern, that are characterized by three frequencies at any time, as illustrated for example in FIGS. 5A-5D according to one embodiment. With continued reference to FIG. 8, the detector 800 includes three digital filters 802, 804, 806 with low implementation complexity, each digital filter comprising a second-order infinite impulse response (IIR) stage followed by a two-tap finite impulse response (FIR) stage, for the estimation of the energy of the readback HD servo signal at a specific frequency according to the Goertzel algorithm. Other arrangements and components may be used for the three digital filters 802, 804, 806 as would be understood by one of skill in the art upon reading the present descriptions. The waveform periods (in nm) corresponding to the three frequencies may be assumed to be integer multiples of a fundamental period, T.

For an accurate estimation of the energies of the three periodic waveform components in a finite integration interval, the frequencies of the periodic waveform components preferably match the characteristic frequencies of the three digital filters 802, 804, 806, denoted by $\omega_0/2\pi$, $\omega_1/2\pi$, and $\omega_2/2\pi$, respectively. When a match is not possible, it is preferred that the frequencies are within about 0.001% to 1.0% of the frequencies set for the three digital filters 802, 804, 806, and more preferably a difference of less than about 0.1%. This may be achieved by resampling the output sequence of the ADC 808 at appropriate time instants, which may be provided by an interpolator 810, with a time base obtained from the tape velocity and a given interpolation distance $\Delta x_{HD}$, as shown in FIG. 8. The frequency $f_s$ of the clock 818, is used as an input to the ADC 808, the counter 820, and the digital circuitry of the detector 800. Moreover, the frequency $f_s$ of the clock 818 may be either a fixed frequency or a variable frequency.

In one embodiment, the interpolator 810 may be a cubic Lagrange interpolator to achieve smaller signal distortion than a linear interpolator. Of course, any suitable interpolator may be used, as would be understood by one of skill in the art. The output signal samples of the interpolator 810 are obtained that correspond with HD servo signal samples taken at points on the tape that are separated by a step interpolation distance equal to $\Delta x_{HD}$, independently of the tape velocity. $\Delta x_{HD}$ is preferably selected such that the condition $T/\Delta x_{HD}=K$ is satisfied, where K is a positive integer number. The time base for the generation of the interpolator output samples may be provided by an interpolation time computation unit 812, which yields the sequence of time instants $\{t_n\}$, at which the resampling of the ADC output sequence takes place. Time instants $\{t_n\}$ may furthermore be provided to circular buffer 822.

The detector 800 illustrated in FIG. 8 may be configured such that a given number of samples is computed by the interpolator 810 within a clock interval $T_s=1/f_s$. However, doing so may set a limit on the maximum tape velocity at which the detector 800 may operate, the maximum tape velocity represented by $2\Delta x_{HD}/T_s$. The maximum tape velocity supported by the detector 800 may be increased by allowing a larger number of samples to be computed by the interpolator 810 within a single clock interval, but doing so also increases computational complexity.

For a fixed tape velocity, the time instants $\{t_n\}$ may be uniformly spaced by $T_1$ seconds, where $T_1$ denotes the time interval that it takes for the tape to travel over a distance equal to the step interpolation distance $\Delta x_{HD}$. The estimation of the time interval $T_1$ is performed by a step interpolation time computation unit 814, which computes $T_1=\Delta x_{HD}/v_{est}$, i.e., the ratio between $\Delta x_{HD}$ and the estimate of the instantaneous tape velocity $v_{est}$, which may be obtained from the TBS channel in one approach. The TBS channel may operate as a synchronous TBS channel according to one embodiment. The average number of interpolated signal samples generated per ADC clock interval is given by the ratio $T_s/T_1$, where $T_s$, $=1/f_s$ denotes the clock interval. The ADC clock frequency, $f_s$, may be a fixed frequency in one approach, or a variable frequency in another approach.

In one embodiment, the HD detector 800 may be configured to estimate the tape velocity to determine time instants at which to obtain interpolated signal samples to input to the Goertzel algorithm as filtering elements based on an output of a TBS channel of the tape drive configured to process a TBS pattern written on the servo band of the magnetic tape medium.

However, tape velocity during use may not be fixed for a given operation and/or between tapes. Moreover, tape drives are expected to operate over a range of tape speeds, e.g. in the range of 1 to 6 m/s, in order to match variable host data rates. The combination of periodic waveforms of various frequencies along HD servo patterns and the variable tape speed leads to a large range of update rates (e.g., frequencies) and a variable delay at which the position estimates are provided to the servo controller. Accordingly, an improved process of adjusting lateral position estimation resolution with respect to estimation delay, spatial frequency resolution and estimation resolution (e.g., noise) may desirably be implemented, as will be described in further detail below.

Referring still to FIG. 8, in another embodiment, the HD detector 800 may be configured to compute a head lateral position estimate for coarse positioning of the servo reader based on an output of a TBS channel of the tape drive. Also, the HD detector 800 may be configured to adjust settings for at least one digital filter according to waveform frequency components of the HD servo signal estimated based on the head lateral position estimate. For example, the setting $\omega_i$ of the i-th digital filter may be adjusted based on the coarse position estimate and the known frequency $\omega_i=2\pi f_i$ of the HD patterns located at that estimated (coarse) lateral position. In another example, the settings of the i-th digital filter may be adjusted based on the coarse position estimate and the combination of symbol length, integration interval, etc., of the HD patterns located at that estimated (coarse) lateral position.

The HD detector 800 receives, as inputs, values of the three characteristic frequencies $\{\omega_0, \omega_1, \omega_2\}$, with $\omega_i=2\pi f_i$ from which the coefficients of the digital filters 802, 804, 806 are obtained. These frequencies may be obtained from the knowledge of the servo reader lateral position provided by the TBS channel in one embodiment, as described above. The number (N) is the number of samples over which the estimates of the energies of the periodic waveforms are computed. N determines the length of the integration interval, and therefore, also determines the spatial frequency resolution. Assuming N is even, N/2 is the number of frequencies for which energy estimates would be provided by a DFT/FFT-based HD detector that operates over N samples. N may be obtained from the tape drive memory in one embodiment.

Typically, N is about 100 or larger. Multiplication of the three energy estimates by gain factors $g_i$, for i=0, 1, 2, is provided to compensate for the different attenuations that the readback HD servo signal may experience at different frequencies, where the normalization $g_1=1$ may be assumed. Hence, a lateral position estimate of the HD servo reader 816, and hence a position error signal from the knowledge of the target head position, may be obtained by a linear combination of the three energy estimates. Note that the maximum number of spectral estimates that are computed at any time is determined by the maximum number of tracks that may be read by the HD servo reader 816, which may equal three in some approaches, and not by the overall number of tones in the HD servo pattern, which may be larger than three. In a case where the number of tones is larger than three, the values of the three characteristic frequencies $\{\omega_0, \omega_1, \omega_2\}$ that are provided to the HD detector 800 may be derived from knowledge of the lateral position estimate obtained from the TBS channel, as mentioned above.

In another embodiment, the HD detector 800 may be implemented without an interpolator 810, but with digital filters configurable to adjust their settings according to the waveform spatial frequency components of the HD servo signal read from the magnetic tape medium and the tape velocity. Adjustment of the digital filters settings may be based on a coarse head lateral position estimate and/or a tape velocity estimate computed based on an output of a TBS channel of the tape drive.

In an alternate embodiment, an HD detector may implement additional digital filters, in excess to the digital filters used to estimate the energies at the frequencies corresponding to the patterns written on the tracks being read simultaneously by the HD servo reader 816. The one or more excess digital filters may be used to simplify reconfiguration of the detector when the target lateral position changes and, therefore, the input values of frequencies $\{\omega_x\}$ vary dynamically.

In a further embodiment, the one or more excess digital filters may be used to distinguish HD patterns characterized by a small number of spectral components/lines from broadband noise and/or data signals. This may be achieved by choosing the characteristic frequency $\omega_t$ of the excess digital filter such that it measures a spectral component at a frequency that is not used by the HD patterns.

The outputs $|X_{i,t}|^2$ from the three digital filters 802, 804, 806 are provided to a PES computation unit 824, which provides a position error estimate ($\varepsilon_t$) at given time t.

Other components of the HD detector 800 may operate as would be known to one of skill in the art, and are omitted here for the sake of clarity of the described embodiments.

As described above, a signal obtained while reading a HD servo pattern may be used to estimate the lateral position of a tape head relative to a magnetic medium having the HD servo pattern written thereon. Unlike TBS patterns, HD servo patterns may not have defined, reoccurring frames. Therefore, the readback signal corresponding to a given window of the HD servo pattern may be used to derive the lateral position estimate. Again, the energy level corresponding to each of the respective frequencies in a readback signal from a given window of a HD servo pattern read by a servo reader may be used to determine a lateral position estimate for a tape head relative to the magnetic medium, e.g., see description of FIGS. 5A-5D above. Moreover, a comparison of the different energy values may be used to determine a fine lateral position estimation of the tape head with respect to the magnetic medium (magnetic tape).

Once a lateral position estimate has been determined, a track-following servo control loop may be used to calculate a PES by subtracting the desired position from the position estimate. Looking now to FIG. 9, an exemplary track-following servo control loop 900 is illustrated in accordance with one embodiment. As an option, the present servo control loop 900 may be implemented in conjunction with features from any other embodiment listed herein, such as those described with reference to the other FIGS. However, such servo control loop 900 and others presented herein may be used in various applications and/or in permutations which may or may not be specifically described in the illustrative embodiments listed herein. Further, the servo control loop 900 presented herein may be used in any desired environment. Thus FIG. 9 (and the other FIGS.) may be deemed to include any possible permutation.

The input to the servo control loop 900 is shown as being calculated by subtracting the desired position $y_{ref}$ from the position estimate $y_{pos}$, thereby forming the PES, as described above. Moreover, the PES is passed to a track-following compensator 902 (e.g., a controller) which in turn produces a signal $u_y$ which may be combined with vibration disturbances $d_v$ before being passed to a current driver (not shown) and an actuator control module 904. The input control signal to the actuator control module 904 is used to move the corresponding tape head in a desired direction based on the PES, as would be appreciated by one skilled in the art after reading the present description. The signal y at the output of the actuator control module 904 indicates the lateral position of the tape head. Moreover, the signal y may be combined with lateral tape motion (LTM) disturbances dLTM before being passed to a delay module 906 and a remainder of a control system. LTM may be caused by imperfections in the tape transport system rollers, reels, motors, etc.

As shown, the output from delay module 906 is redirected back and used to determine the next PES corresponding to a subsequent servo sub-frame read by a servo reader. In doing so, the servo control loop 900 may be able to keep the tape head at a desired position relative to a magnetic tape to enable efficient writing to and/or reading from the magnetic tape.

Figure 10:
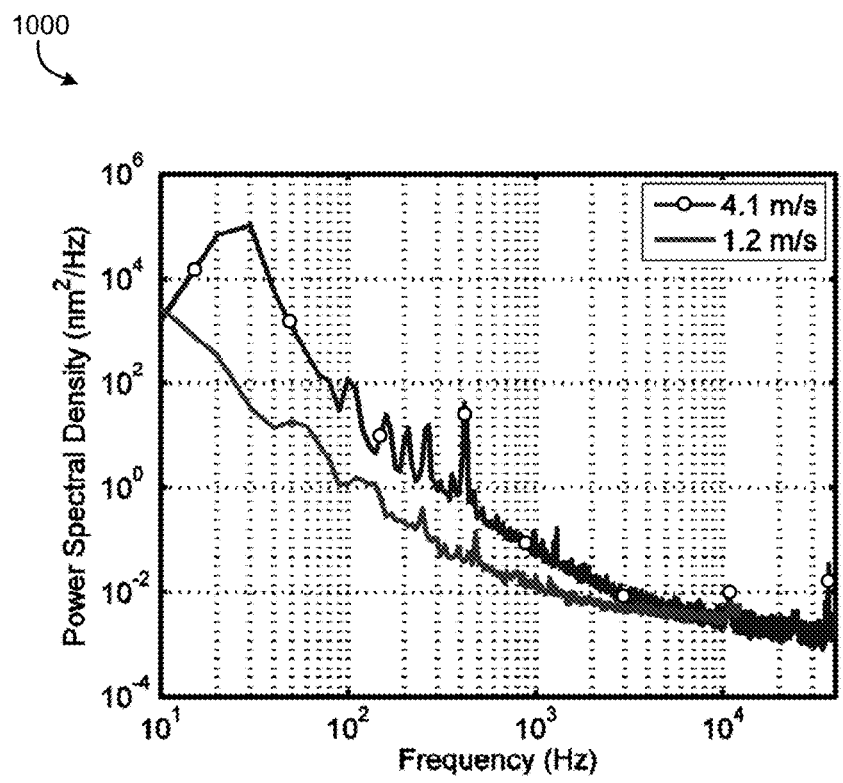
FIG. 10 is a graph plotting the power spectral density vs. frequency for two different tape speeds.

Looking to graph 1000 of FIG. 10, plots for power spectral density of LTM are shown for two different tape speeds. In other words, the plots included in graph 1000 correspond to LTM rather than any head activation caused by a controller. Here, the LTM caused by transporting the tape from one reel to the other results in a higher amount of mechanical motion at lower frequencies than at higher frequencies. Tracking errors may be affected by one or more parameters such as position estimation resolution, system delay and/or sampling times, LTM at high and/or low tape speeds, mechanical coupling, vibration environments, etc. As the frequency increases, a noise floor dominated by estimation noise is typically reached. Thus, at higher frequencies, control loops may be limited by how accurately the position of the tape head may be estimated.

In order to lower the noise floor and thereby improve the accuracy by which the position of the tape head may be estimated compared to what has been previously achievable, various embodiments described herein may combine (e.g., average) a number of previous servo estimates (lateral position estimates) from a single servo reader, or more than one servo reader. By combining more than one servo estimate over time or effectively some distance on tape, a more accurate determination of the position of the tape head may be achieved. However, although combining greater than one servo estimates allows for a more accurate determination of the position of the tape head, it also introduces a delay in making such a determination, e.g., dependent on tape speed. Attempts to adjust the size (e.g., length) of the window of the HD servo pattern used to determine a lateral position estimate have previously been made in an attempt to reduce the delay experienced. However, adjusting the window length detrimentally affects the spatial frequency resolution of the system as tape speed constantly changes during practice. Thus, a trade-off between accuracy (resolution) of the position estimate, delay, and spatial frequency resolution may exist in the various embodiments described herein, as will soon become apparent.

Figure 11:
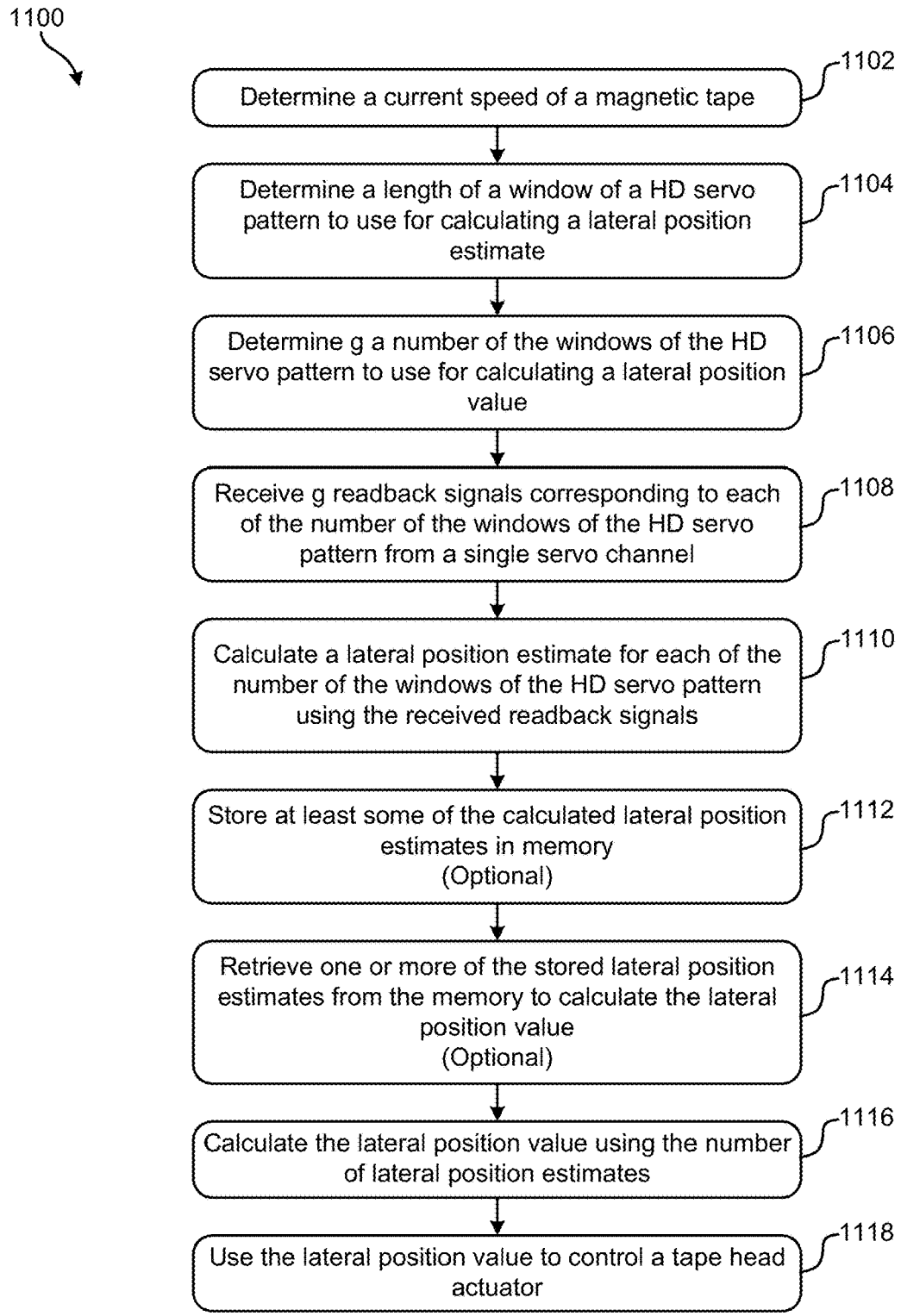
FIG. 11 is a flowchart of a method, according to one embodiment.

Looking to FIG. 11, a flowchart of a method 1100 is illustrated in accordance with one embodiment. The method 1100 may be performed in accordance with the present invention in any of the environments depicted in FIGS. 1-10, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in some embodiments, any one or more of the operations included in method 1100 may be performed or implemented by a tape drive (e.g., see 100 of FIG. 2). In other various embodiments, the method 1100 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 11, operation 1102 includes determining a current speed of a magnetic tape, e.g., from a servo track on the magnetic tape. The current speed of a magnetic tape may be determined by evaluating the readback signal from a servo reader reading the servo stripes of a TBS track, as would be appreciated by one skilled in the art after reading the present description.

Moreover, operation 1104 includes determining a length of a window of a HD servo pattern to use for calculating average energies of HD waveforms, from which a lateral position estimate is obtained. The HD servo pattern may be written on a magnetic tape, e.g., of a type known in the art. As previously mentioned, unlike TBS patterns, HD servo patterns may not have defined, reoccurring frames. Therefore, the readback signal corresponding to a given window of the HD servo pattern may be used to derive (calculate) a lateral position estimate, e.g., by comparing energy values (levels) corresponding to each of the respective frequencies therein (e.g., see FIGS. 5A-5D above).

In some approaches, energy values may be determined by integrating the power of the readback signal over a given amount of time (or distance along the tape). It follows that the length (size) of the window of a HD servo pattern may determine the spatial frequency resolution for a given implementation. This is because integrating over a longer time frame (or over a larger area) provides a better spectrally resolved result. However, tape velocity during use may not be constant for one or more given operations and/or between tapes, e.g., there might be velocity fluctuations around a target velocity. However, the shorter the integration time, the smaller the effect of velocity variations on the energy estimation.

In sharp contrast to the foregoing conventional shortcomings, a minimum window length ($D_w$) is preferably chosen in various embodiments, such that the spatial frequency resolution ($\sim 1/D_w$) is sufficiently large to allow reliable energy estimation without increasing the length of the window, and sufficiently small to provide robustness against velocity variations. The minimum window length $D_w$ chosen may be based (at least in part) on a current, intended, anticipated, etc., tape speed (e.g., see lookup table 1300 of FIG. 13 below). According to an exemplary embodiment, the length of the window $D_w$ chosen may correspond to the minimum anticipated tape speed such that unnecessary delay is not introduced to the system during operation at low tape speeds. Moreover, when the tape speed increases above the minimum anticipated tape speed, more than one lateral position estimate derived from more than one window length may be combined, e.g., as described in further detail below. According to various illustrative approaches, which are in no way intended to limit the invention, the minimum window length $D_w$ may be in a range from about 5 μm to about 50 μm, but could be higher or lower.

With continued reference to FIG. 11, operation 1106 includes determining a number of the windows of the HD servo pattern to use for calculating a lateral position value. As mentioned above, one lateral position estimate may be derived (calculated) from each respective window length of the HD servo pattern. Thus, operation 1106 is essentially determining a number of lateral position estimates to use for calculating the lateral position value. In other words, operation 1106 may essentially determine a number of samples for calculating the lateral position value. According to the present description, a "lateral position value" is intended to represent the current (or a most recently determinable) position of a tape head relative to a magnetic tape being passed thereover. Moreover, the lateral position value may be measured in a cross-track (lateral) direction (e.g., see 304 of FIG. 3).

As alluded to above, using a larger number of lateral position estimates derived from a larger number of windows to calculate the lateral position value achieves a more accurate result because doing so essentially increases the combined amount of time (or distance along the tape) which the energy values are being integrated over. However, although using a larger number of lateral position estimates derived from a larger number of windows to calculate the lateral position value achieves a more accurate result, a corresponding amount of delay is also introduced. For example, it takes about twice as long for a servo reader to pass over an amount of tape corresponding to a number of windows of equal length involved with calculating 4 separate lateral position estimates than it does to pass over a number the windows involved with calculating 2 lateral position estimates. Accordingly, there is a longer delay in achieving the 4 separate lateral position estimates than there is to achieving the 2 lateral position estimates. As the number of lateral position estimates used to calculate a lateral position value increase, so does the delay. Thus, a trade-off between the accuracy (resolution) of the lateral position value, and the delay in determining the lateral position value exists. Moreover, this trade-off is also affected by the spatial frequency resolution associated with the chosen length of the window.

According to various embodiments described herein, this trade-off between accuracy and delay may desirably be optimized as a function of tape speed, as tape speed may change multiple times during operation. Changes in tape speed may result from effects such as host system processing bandwidth, the rate at which data is received, available throughput, etc. Although delay increases with the number of lateral position estimates used to calculate a lateral position value, the actual amount of delay depends on the speed at which the tape is being passed over the servo readers. For example, at lower tape speeds (e.g., from about 1 m/s to about 3 m/s), the amount of delay associated with determining 3 separate lateral position estimates from 3 separate windows of a HD servo track is greater than the amount of delay associated with determining 3 separate lateral position estimates from 3 separate windows of a HD servo track on a tape traveling at faster speeds, again assuming each of the windows are equal in length. This is because faster tape speeds (e.g., from about 4 m/s to about 9 m/s) allow for the servo reader to read a larger number of windows of the HD servo track per unit of time than at lower tape speeds, thereby allowing for the lateral position estimates to be determined more often for faster tape speeds also.

It follows that a greater number of windows, and therefore a greater number of lateral position estimates, may be used to calculate a lateral position value when tape speeds are higher (thereby maintaining the resulting delay within desired limits), while a lower number of windows, and therefore a fewer number of lateral position estimates, may be used to calculate a lateral position value when tape speeds are lower (as the delay associated with lateral position estimation is larger). In other words, the lateral position estimation delay is larger at lower tape speeds, e.g., due to fixed window lengths in HD servo patterns, while lateral position estimation delays are lower at higher tape speeds. In some approaches, the tape speed may be so low that only one window, and therefore only one lateral position estimate, may be used for calculating the lateral position value. In other words, the lateral position estimate derived from each window of the HD servo pattern may be used by the track-following servo control loop as the actual lateral position value. However, using each lateral position estimate individually (without combining any estimates) may only be implemented temporarily. The number of windows, and therefore the number of lateral position estimates, used to calculate the lateral position value may be increased as the speed of tape increases.

It follows that the number of the windows of the HD servo pattern determined in operation 1106 to be used for calculating the lateral position value may depend on (be based on) the speed of tape in some approaches. Again, the lower amounts of delay corresponding to faster tape speeds allow for more windows of the HD servo pattern to be read and for more lateral position estimates to be gathered and used to calculate a lateral position value, while the higher amount of delay associated with lower tape speeds does not. Accordingly, operation 1102 may be performed when the current speed of the magnetic tape is desired in order to determine the number of windows of the HD servo pattern to use. However, in some approaches the number of windows of the HD servo pattern may be determined based on other information. For instance, the number of windows of the HD servo pattern determined in operation 1106 may be based on any one or more of tape speed, vibration conditions, media type, mechanical coupling, environmental conditions, imperfections in the tape transport system, etc.

According to an example, which is in no way intended to limit the invention, the number of windows of the HD servo pattern, and therefore the number of lateral position estimates, may be determined by using a lookup table (e.g., stored in memory). The lookup table may define how many lateral position estimates from windows of the HD servo pattern should be combined (e.g., averaged) as a function of a tape speed index $s_i$ (velocity of tape), e.g., before being used in a track-following control loop. Looking momentarily to FIG. 12, an exemplary lookup table 1200 is illustrated. As shown, a speed index Si input is applied to determine the number of lateral position estimates $c_i$ to use when calculating the lateral position value, which directly correlates to the number of windows of the HD servo pattern to use for calculating the lateral position value. The number of lateral position estimates may thereby be output and applied when performing operation 1106.

The entries in lookup table 1200 of FIG. 12 may be predetermined, determined using an equation, selected by a user, based on modeling, etc. According to some approaches, the entries in lookup table 1200 of FIG. 12 may be determined using Equation 1 below. It should also be noted that lookup table 1200 may incorporate additional input parameters which may be used to determine the number of lateral position estimates $c_i$ from a corresponding number of windows of the HD servo pattern to use/output therefrom. Additional input parameters may include those related to one or more of: vibration conditions, media types, environmental conditions (e.g., temperature, humidity, etc.), etc. Moreover, the contents of the lookup table 1200 may be static in some approaches, whereby the outputs are fixed relative to given input values. However, in other approaches the contents of the lookup table 1200 and/or their interrelationships may be adaptive.

Referring again to method 1100, operation 1108 includes receiving readback signals corresponding to each of the number of the windows of the HD servo pattern from a single servo channel. Moreover, operation 1110 includes calculating a lateral position estimate for each of the number of the windows of the HD servo pattern, e.g., using the readback signals received in operation 1108. As described above, a lateral position estimate may be calculated from a window of the HD servo pattern by using the readback signal form a servo reader reading the HD servo channel. According to a specific approach, a lateral position estimate may be calculated from a window of the HD servo pattern by evaluating the energy values of the spectral components in the signals read from the window by a corresponding servo reader (e.g., see FIGS. 5A-5D above). Moreover, a comparison of the corresponding energy values may be used to determine a fine position of the servo reader with respect to a magnetic tape.

Accordingly, the rate at which the lateral position estimates may be calculated may depend on the rate at which readback signals from each of the number of the windows of the HD servo pattern are received, which may in turn depend on the speed of tape, an amount of processing bandwidth, the window length, etc., depending on the desired embodiment. In some approaches, the lateral position estimate may also include (e.g., be supplemented by) a tape velocity estimate, tape skew estimate (relative to an orientation of a magnetic head), etc., which may be derived from a servo channel corresponding to a TBS pattern, as would be appreciated by one skilled in the art after reading the present description. Moreover, supplemental values may be calculated using one or more of the additional estimates received. For instance, a magnetic tape velocity value may be calculated using received tape velocity estimates, a magnetic tape skew value (relative to an orientation of the magnetic head) may be calculated using received tape skew estimates, etc., depending on the desired approach. Once calculated, the supplemental values may be combined with a lateral position value before being used to control a tape head actuator, as will be described in further detail below (e.g., see operation 1118).

It should be noted that although operation 1108 includes receiving signals corresponding to each of the number of the windows of a HD servo pattern from a single servo channel, signals corresponding to windows of other HD servo patterns may also be received from other servo channels, e.g., as will be described in further detail below.

Although lateral position estimates may be calculated using the readback signal corresponding to a window of the HD servo pattern received from a servo reader reading the HD servo pattern, in some approaches, lateral position estimates may be retrieved from memory. It follows that lateral position estimates received from a servo channel may be stored in memory such that they may be available for future use. Accordingly, optional operation 1112 includes storing at least some of the lateral position estimates calculated in operation 1110, in a designated location in memory. The number of previously derived lateral position estimates stored in memory may depend on the desired approach. In some approaches, the previously derived lateral position estimates may be stored in memory in a shifting manner, whereby an oldest one or more of the lateral position estimates stored in memory are replaced by a newly received one or more lateral position estimates, e.g., in a first-in-first-out (FIFO) or ring-buffer. Thus, the number of lateral position estimates stored in memory at any given time may be fixed. However, in other approaches the number of lateral position estimates stored in memory at a given time may vary. Moreover, the memory may be of any desired type (e.g., a buffer, a lookup table, history, registers, etc.) and may at least be electrically coupled to the device performing the operations of method 1100.

Optional operation 1114 also includes retrieving one or more of the stored lateral position estimates from the memory to calculate the lateral position value. Again, although lateral position estimates may be derived from the readback signal received from a HD servo pattern, in some approaches, lateral position estimates may be retrieved from memory in order to calculate the lateral position value. Thus, depending on the desired approach, any number of lateral position estimates previously determined and stored in memory may be retrieved and preferably used to calculate a new lateral position value.

Method 1100 also includes calculating the lateral position value using the number of lateral position estimates. See operation 1116. Depending on the approach, the number of lateral position estimates may be used to calculate the lateral position value differently. For instance, in some approaches the lateral position value may be calculated by averaging the number of lateral position estimates, e.g., according to a number of samples. However, in other approaches the lateral position value may be calculated by implementing a weighted averaging, e.g., such that a higher weight is assigned to the most recent sample(s), and a lower weight is assigned to older samples. In some approaches, the way in which the lateral position value is calculated may depend on the number of lateral position estimates that are available.

Figure 9:
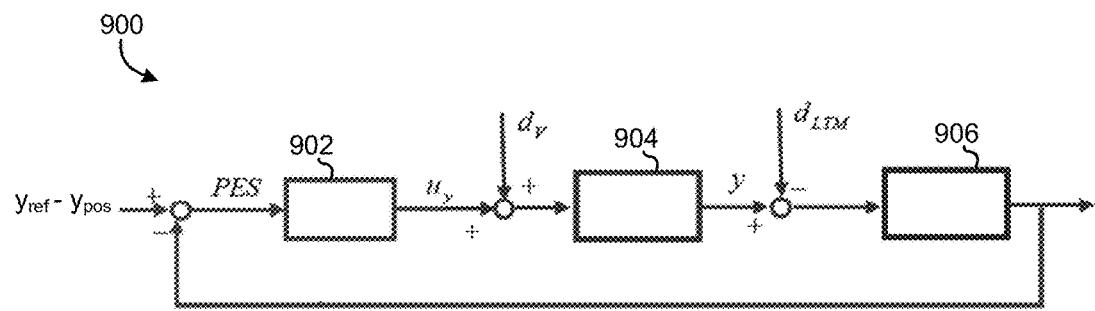
FIG. 9 is a block diagram of a track-following servo control loop, according to one embodiment.

Furthermore, operation 1118 includes using the lateral position value to control a tape head actuator. Once a lateral position value corresponding to the position of a tape head relative to a magnetic tape has been determined (e.g., calculated), that value is preferably used to adjust the position of the tape head, e.g., in a conventional matter. According to some approaches, the lateral position value may be sent to a track-following actuator, a current driver for the track-following actuator, and/or a controller coupled to the track-following actuator. For example, operation 1118 may include implementing the lateral position value in a track-following servo control loop, e.g., as shown in FIG. 9.

It should be noted that one or more the operations included in method 1100 may be repeatedly performed during run-time, e.g., while writing to, reading from, performing a coarse look-up on, etc. a magnetic tape. Moreover, according to different approaches, the operations included in method 1100 may be performed synchronously in dependence upon tape speed, or asynchronously independent of tape speed. According to a synchronously implemented example, the operations included in method 1100 may be performed in direct response to passing over another window of the HD servo pattern, thereby resulting in a new readback signal being received and a new lateral position estimate being determined. However, an asynchronously implemented example may include the operations in method 1100 being performed at a predetermined frequency, such as 20 kHz or any other desired value.

As mentioned above, although method 1100 includes receiving signals corresponding to each of the number of the windows of a HD servo pattern from a single servo channel, signals corresponding to windows of other HD servo patterns may also be received from other servo channels. In some approaches, lateral position estimates derived from a readback signal corresponding to windows of a first HD servo pattern read by a first servo reader may be combined (e.g., averaged) with lateral position estimates derived from a readback signal corresponding to windows of a second HD servo pattern read by a second servo reader. For example, readback signals corresponding to a number of windows of a HD servo pattern may be received from two servo channels, three servo channels, four servo channels, multiple servo channels, etc., and may be combined (e.g., averaged together) to form a combined lateral position value. By combining lateral position estimates derived from readback signals from more than one HD servo track read by more than one servo reader, the accuracy (resolution) of the resulting lateral position value is improved because each of the servo readers may estimate the same lateral position, but the noise corresponding to the lateral position estimate made from each of the servo readers is uncorrelated.

Thus, combining multiple lateral position estimates may cause corresponding noise to be reduced, thereby allowing a control loop to operate at a lower rate, while maintaining an improved PES performance. Moreover, a lateral position value formed by combining lateral position estimates from two or more parallel servo channels may be buffered in some approaches, e.g., such that it may be provided to a microcontroller at a reduced interrupt rate.

Figure 14:
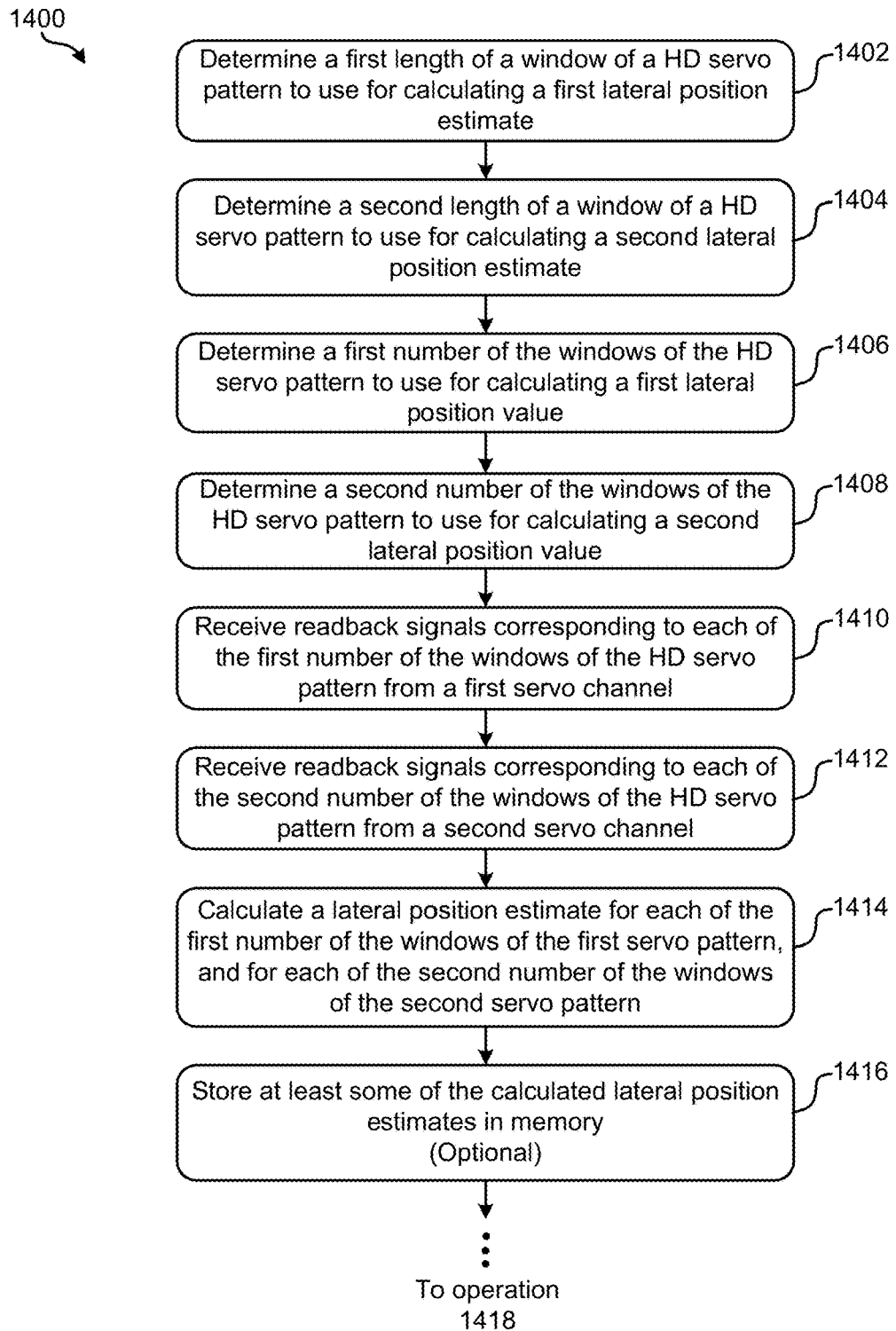
FIG. 14 is a flowchart of a method, according to one embodiment.
Figure 14:
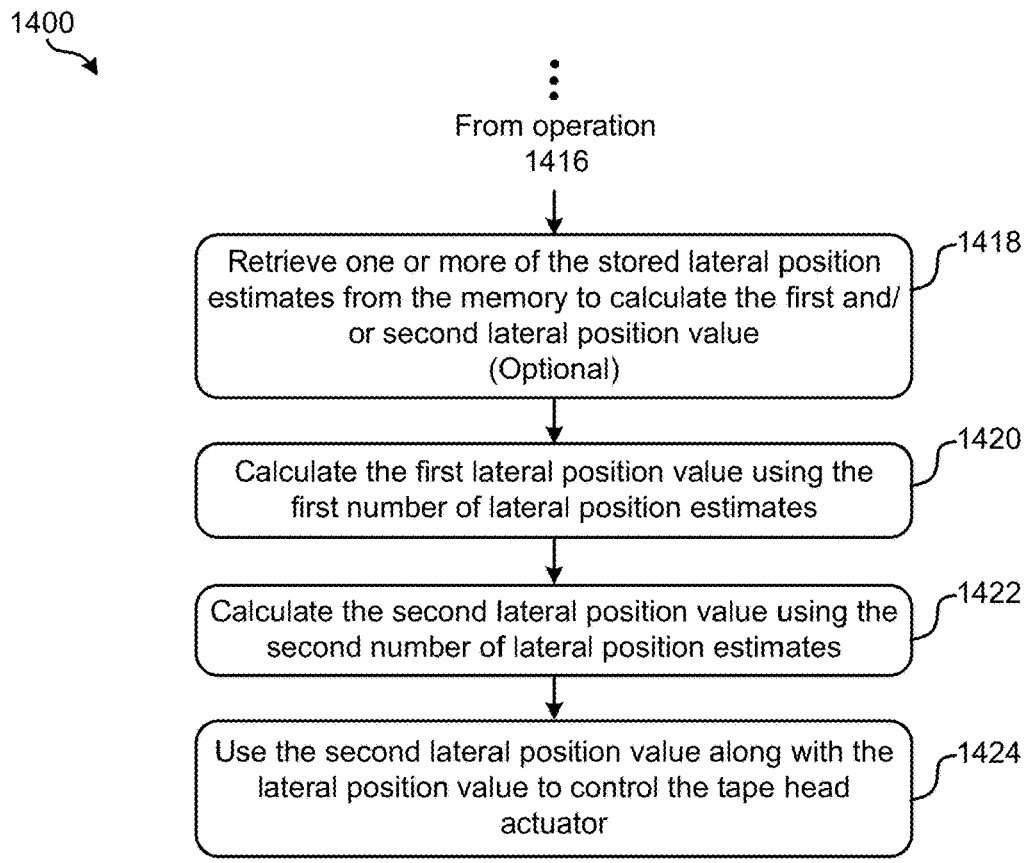

Looking now to FIG. 14, a flowchart of a method 1400 is illustrated in accordance with one embodiment. The method 1400 may be performed in accordance with the present invention in any of the environments depicted in FIGS. 1-10, among others, in various embodiments. Of course, more or less operations than those specifically described in FIG. 14 may be included in method 1400, as would be understood by one of skill in the art upon reading the present descriptions.

Each of the steps of the method 1400 may be performed by any suitable component of the operating environment. For example, in some embodiments, any one or more of the operations included in method 1400 may be performed or implemented by a tape drive (e.g., see 100 of FIG. 2). In other various embodiments, the method 1400 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 14, operation 1402 includes determining a first length of a window of a HD servo pattern to use for calculating a first lateral position estimate, while operation 1404 includes determining a second length of a window of a HD servo pattern to use for calculating a second lateral position estimate. The readback signal corresponding to a given window of the HD servo pattern may be used to derive (calculate) a lateral position estimate, e.g., by comparing energy levels corresponding to each of the respective frequencies therein (e.g., see FIGS. 5A-5D above). Moreover, the length (size) of the window of a HD servo pattern may determine the spatial frequency resolution for a given implementation. Thus, a minimum window length ($D_w$) is preferably chosen such that the spatial frequency resolution ($\sim 1/D_w$) is sufficiently large to allow reliable energy estimation without increasing the length of the window, and sufficiently small to provide robustness against velocity variations.

Furthermore, 1406 includes determining a first number of the windows of the HD servo pattern to use for calculating a first lateral position value, while operation 1408 includes determining a second number of the windows of the HD servo pattern to use for calculating a second lateral position value. As mentioned above, one lateral position estimate may be derived (calculated) from each respective window length of the HD servo pattern. Thus, operations 1406 and 1408 are essentially determining a number of lateral position estimates to use for calculating the first and second lateral position values respectively.

The number of lateral position estimates used to calculate a given lateral position value may depend on the tape speed. Faster tape speeds may allow for a greater number of lateral position estimates to be used to calculate a respective lateral position value, thereby achieving a more accurate result without introducing an undesirable amount of delay in doing so. However, slower tape speeds may call for a fewer number of lateral position estimates to be used in calculating the respective lateral position value, thereby sacrificing accuracy in order to avoid detrimental delay. However, determining the first and/or second number of the windows of the HD servo pattern to use for calculating the respective lateral position value may vary depending on one or more of vibration conditions, media type, mechanical coupling, environmental conditions, imperfections in the tape transport system, etc.

According to some approaches, the second number of windows of the HD servo pattern may be determined according to (based on) the first number of windows of the HD servo pattern. In other words, the first and second number of windows of the HD servo pattern may be the same in some approaches. However, the first and second number of the windows of the HD servo pattern may be different, e.g., depending on the desired embodiment.

According to an example, which is in no way intended to limit the invention, the first and/or second number of windows of the HD servo pattern, and therefore the respective number of lateral position estimates, may be determined by using a lookup table (e.g., stored in memory). The lookup table may define how many lateral position estimates $c_i$ from windows of the HD servo pattern should be combined (e.g., averaged) and/or the length $D_w$ of the windows themselves, as a function of a tape speed index $s_i$ (velocity of tape), e.g., before being implemented in a track-following control loop. Looking momentarily to FIG. 13, an exemplary lookup table 1300 is illustrated.

As shown, a speed index $s_i$ input is applied to determine the number of windows of the HD servo pattern $c_i$ (which directly correlate to the number of lateral position estimates $c_i$) to use when calculating the lateral position value. Moreover, the speed index $s_i$ input may be applied to determine the length $D_w$ of the windows themselves. The number of lateral position estimates to combine for calculating a lateral position value, and/or the length $D_w$ of the windows used to determine such lateral position estimates, may thereby be output and applied when performing any one or more of operations 1402-1408.

The entries included in a lookup table such as lookup table 1200 of FIG. 12 may be determined using any desired approach that would become apparent to one skilled in the art upon reading the present description. In some approaches, the entries in lookup table 1200 of FIG. 12 may be determined using an equation such as Equation 1 below. Accordingly, the number of lateral position estimates $c_i$ from windows of a HD servo pattern to be combined for forming a lateral position value and window lengths $D_w$ may be chosen for ranges of tape speeds. It should also be noted that lookup table 1200 may incorporate additional input parameters such as vibration conditions, media types, environmental conditions (e.g., temperature, humidity, etc.), etc., which may be used to determine an output therefrom. Moreover, the contents of the lookup table 1200 may be static in some approaches (e.g., predetermined), whereby the outputs are fixed relative to given input values. However, in other approaches the contents of the lookup table 1200 and/or their interrelationships may be adaptive.

Referring again to method 1100, operation 1410 includes receiving readback signals corresponding to each of the first number of the windows of the HD servo pattern from a first servo channel. Moreover, operation 1412 includes receiving readback signals corresponding to each of the second number of the windows of the HD servo pattern from a second servo channel that is preferably different than the first servo channel. In some approaches, the first and second servo channels may correspond to servo tracks read by respective servo readers on opposite sides of a data band on a magnetic tape (e.g., see FIG. 4A). However, in other approaches, the first and second servo channels may correspond to servo tracks on the same side of a data band on a magnetic tape, read by two different servo readers.

Lateral position estimates may thereby be calculated for each of the first and second number of windows using the readback signals received in operations 1410, 1412. See operation 1414. One lateral position estimate may be calculated from each window of the HD servo pattern by using the readback signal corresponding thereto. Again, a lateral position estimate may be calculated from a window of the HD servo pattern in some approaches by evaluating the energy values of the spectral components in the signals read from the window by a corresponding servo reader (e.g., see FIGS. 5A-5D above). Moreover, a comparison of the corresponding energy values may be used to determine a fine position of the servo reader with respect to a magnetic tape. In some approaches, the lateral position estimate may also include (e.g., be supplemented by) a tape velocity estimate, tape skew estimate, etc.

Furthermore, optional operation 1416 includes storing in memory at least some of the lateral position estimates calculated in operation 1414, e.g., according to any of the approaches described above. Again, although lateral position estimates may be calculated using the readback signal corresponding to a window of the HD servo pattern received from a servo reader reading the HD servo pattern, previously determined lateral position estimates may be retrieved from memory, e.g., to be used to calculate one or more corresponding lateral position values. Thus, depending on the desired approach, any number of lateral position estimates previously determined and stored in memory may be retrieved and preferably used to calculate one or more new lateral position values. Accordingly, optional operation 1418 may include retrieving one or more of the stored lateral position estimates from the memory to calculate the first and/or second lateral position value.

Referring still to method 1400, operation 1420 includes calculating the first lateral position value using the first number of lateral position estimates, while operation 1422 includes calculating the second lateral position value using the second number of lateral position estimates. Depending on the approach, the first and/or second number of lateral position estimates may be used to calculate the respective first and/or second lateral position values differently. For instance, in some approaches the first and/or second lateral position values may be calculated by averaging the first and/or second number of lateral position estimates, e.g., according to a number of samples. However, in other approaches the first and/or second lateral position values may be calculated by implementing a weighted averaging, e.g., such that a higher weight is assigned to the most recent lateral position estimates (samples), and a lower weight is assigned to older estimates. In some approaches, the way in which the first and/or second lateral position values are calculated may depend on the corresponding number of lateral position estimates that are available.

Operation 1424 includes using the second lateral position value along with the lateral position value to control the tape head actuator. According to some approaches, the first and second lateral position values may be averaged together to form an average lateral position value which may thereby be used to control the tape head actuator, e.g., in a conventional manner. However, in other approaches the first and second lateral position values may be independently used to control the tape head actuator as desired. For example, operation 1424 may include implementing the first and/or second lateral position values in one or more track-following servo control loops, e.g., as shown in FIG. 9.

It should also be noted that in some approaches more than two lateral position values may be calculated from respective lateral position estimates, and used to control a tape head actuator. Depending on the desired approach, a third, fourth, fifth, sixth, etc. lateral position value may be calculated from respective lateral position estimates, and used to control a tape head actuator. According to an illustrative approach which is in no way intended to limit the invention, method 1400 may further include receiving signals corresponding to windows of a third servo pattern from a third servo channel, a lateral position estimate for each of a third number of the windows of the third servo pattern, the third number of the windows of the third servo pattern according to the number of the windows of the servo pattern, calculating a third lateral position value using the lateral position estimates for the third number of the windows, and using the third lateral position value along with the lateral position value and the second lateral position value to control the tape head actuator. Moreover, as alluded to above, each of the servo patterns are preferably a respective high density servo track on the magnetic tape.

Track-following servo control loops may operate at different frequencies, e.g., depending the speed of tape, the number of lateral position estimates used to calculate a lateral position value, length of the windows of the HD servo pattern, etc. Looking to FIG. 15, a flowchart of a method 1500 involving track-following control loops is illustrated in accordance with one embodiment. The method 1500 may be performed in accordance with the present invention in any of the environments depicted in FIGS. 1-11, among others, in various embodiments. Of course, more or less operations than those specifically described in FIG. 15 may be included in method 1500, as would be understood by one of skill in the art upon reading the present descriptions.

Each of the steps of the method 1500 may be performed by any suitable component of the operating environment. For example, in various embodiments, the method 1500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1500. Illustrative processors include, but are not limited to, a central processing unit (CPU), an application specific integrated circuit (ASIC), a field programmable gate array (FPGA), etc., combinations thereof, or any other suitable computing device known in the art.

Figure 15:
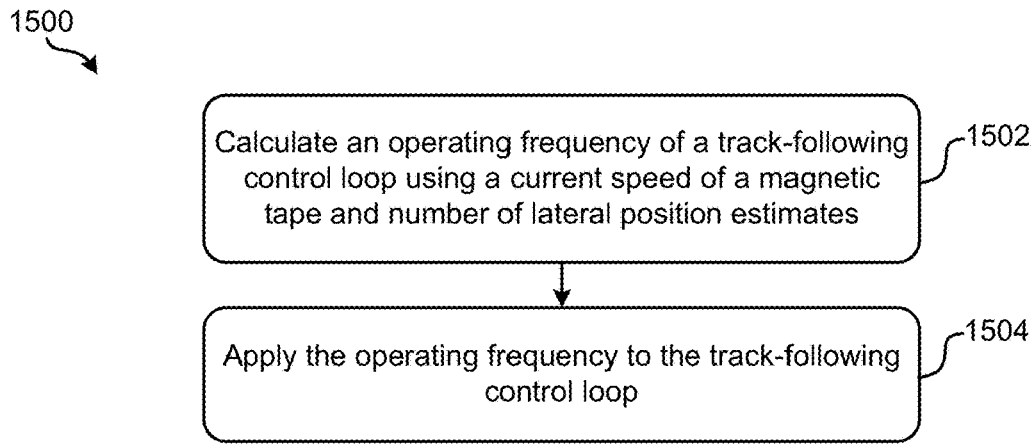
FIG. 15 is a flowchart of a method, according to one embodiment.

As shown in FIG. 15, operation 1502 of method 1500 includes calculating an operating frequency of a track-following control loop using a current speed of a magnetic tape and size (e.g., length) of the window length. According to an exemplary approach, which is in no way intended to limit the invention, the operating frequency of the track-following control loop may be calculated using Equation 1 below.

$$f = \frac{v_i}{(D_w \times c_i)} \qquad \text{Equation 1}$$

Here, 'f' represents the operating frequency which may be measured in Hz, while "$v_i$" corresponds to the current speed of the magnetic tape which may be measured in meters per second. Moreover, "$D_w$" corresponds to the length of the window (measured along a longitudinal axis of the tape) of a HD servo track on the magnetic tape which may be measured in meters, and "$c_i$" corresponds to the number of lateral position estimates (e.g., the sampling rate) determined to be used to calculate a lateral position value as described above. Depending on the desired approach, Equation 1 may be implemented by a controller, a processor, etc., or some other device having one or more processors therein which may be implemented as part of a tape drive.

Referring still to method 1500, operation 1504 includes applying the operating frequency to the track-following control loop, e.g., as seen in FIG. 9.

It should be noted that although the various embodiments included above are described with reference to determining a lateral position value, any one or more of these embodiments may be implemented to form other values (estimates) that are desirable in order to perform efficient servo control, e.g., including a velocity value, a magnetic tape skew value (relative to an orientation of a magnetic head), etc. Accordingly, any one or more of the embodiments described herein may further include receiving additional estimates from one or more servo channels. For instance, the additional estimates may include magnetic tape velocity estimates derived from a TBS, magnetic tape skew estimates (relative to an orientation of the magnetic head) derived from a TBS, etc., depending on the desired approach.

It follows that various embodiments described herein introduce techniques which are able to improve the process of determining the lateral position of a tape head by combining (e.g., averaging) lateral position estimates from windows of a HD servo pattern preferably having a fixed length, while maintaining a constant spatial frequency resolution.

As a result, various techniques included herein significantly improve the spatial frequency resolution of a HD servo channel, the estimation delay/frequency as well as position estimation resolution/noise. As described above, this may be achieved by using multiple lateral position estimates derived from one or more HD servo track windows to calculate the lateral position of a tape head. Moreover, a servo channel (or firmware) may be used to calculate several lateral position estimates to improve the resolution of the estimate, e.g., by reducing the noise in the estimate. This allows a control loop to operate at a lower rate, while improving PES performance. However, for lower tape speeds, each lateral position estimate may be used to control the position of a tape head relative to a magnetic medium, e.g., due to the delay associated with low tape speeds.

These improvements are particularly apparent when compared to the conventional limits on PES utilization. Specifically, conventional implementations often drop position estimates when faced with high tape speeds in view of the clock rate of the microprocessor and the computation complexity of the track-following controller. Conventional implementations also often experience either unmanageable delays or significantly inaccurate lateral position approximations of a tape head during slow tape speeds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable CD-ROM, a DVD, a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A tape drive-implemented method, comprising:
    determining a length of a window of a servo pattern to use for calculating a lateral position estimate;
    determining a number of the windows of the servo pattern to use for calculating a lateral position value;
    receiving signals corresponding to each of the number of the windows of the servo pattern from a single servo channel;
    calculating a lateral position estimate for each of the number of the windows of the servo pattern;
    calculating the lateral position value by using the lateral position estimates; and
    using the lateral position value to control a tape head actuator.

2. The tape drive-implemented method as presented in claim 1, comprising:
    determining a current speed of a magnetic tape,
    wherein determining the number of the windows of the servo pattern is based on the current speed of the magnetic tape.

3. The tape drive-implemented method as presented in claim 2, wherein the number of the windows of the servo pattern is also based on at least one parameter selected from a group of parameters consisting of: a vibration condition, media type, and an environmental condition.

4. The tape drive-implemented method as presented in claim 1,
    wherein the servo pattern is a high density servo track on a magnetic tape.

5. The tape drive-implemented method as presented in claim 4, comprising:
    storing at least some of the lateral position estimates in memory; and
    retrieving the stored lateral position estimates from the memory to calculate the lateral position value.

6. The tape drive-implemented method as presented in claim 1, comprising:
    receiving signals corresponding to windows of a second servo pattern from a second servo channel;
    calculating a lateral position estimate for each of a second number of the windows of the second servo pattern, the second number of the windows of the second servo pattern according to the number of the windows of the servo pattern;
    calculating a second lateral position value using the lateral position estimates for the second number of the windows, wherein the servo pattern is a high density servo track on a magnetic tape, wherein the second servo pattern is a respective high density servo track on the magnetic tape; and
    using the second lateral position value along with the lateral position value to control the tape head actuator.

7. The tape drive-implemented method as presented in claim 1, comprising:
    calculating an operating frequency of a track-following control loop using a current speed of a magnetic tape and the length of the window; and
    applying the operating frequency to the track-following control loop.

8. The tape drive-implemented method as presented in claim 1, comprising:
    receiving additional estimates from the servo channel;
    calculating a supplemental value using the received additional estimates; and
    using the supplemental value to control a tape head actuator,
    wherein the supplemental value is selected from a group consisting of: a current speed of a magnetic tape, and a magnetic tape skew value.

9. The tape drive-implemented method as presented in claim 1, wherein calculating the lateral position value includes: calculating an arithmetic mean of the lateral position estimates, or calculating a weighted average of the lateral position estimates.

10. A computer program product comprising a computer readable storage medium having program instructions embodied therewith, the program instructions executable by a processor to cause the processor to:
determine, by the processor, a length of a window of a servo pattern to use for calculating a lateral position estimate;
determine, by the processor, a number of the windows of the servo pattern to use for calculating a lateral position value;
receive, by the processor, signals corresponding to each of the number of the windows of the servo pattern from a single servo channel;
calculate, by the processor, a lateral position estimate for each of the number of the windows of the servo pattern;
calculate, by the processor, the lateral position value by using the lateral position estimates; and
use, by the processor, the lateral position value to control a tape head actuator.

11. The computer program product as presented in claim 10, the program instructions executable by the processor to cause the processor to:
determine, by the processor, a current speed of a magnetic tape,
wherein determining the number of the windows of the servo pattern is based on the current speed of the magnetic tape.

12. The computer program product as presented in claim 11, wherein the number of the windows of the servo pattern is also based on at least one parameter selected from a group of parameters consisting of: a vibration condition, media type, and an environmental condition.

13. The computer program product as presented in claim 10, wherein the servo pattern is a high density servo track on a magnetic tape.

14. The computer program product as presented in claim 13, the program instructions executable by the processor to cause the processor to:
store, by the processor, at least some of the lateral position estimates in memory; and
retrieve, by the processor, the stored lateral position estimates from the memory to calculate the lateral position value.

15. The computer program product as presented in claim 10, the program instructions executable by the processor to cause the processor to:
receive, by the processor, signals corresponding to windows of a second servo pattern from a second servo channel;
calculate, by the processor, a lateral position estimate for each of a second number of the windows of the second servo pattern, the second number of the windows of the second servo pattern according to the number of the windows of the servo pattern;
calculate, by the processor, a second lateral position value using the lateral position estimates for the second number of the windows, wherein the servo pattern is a high density servo track on a magnetic tape, wherein the second servo pattern is a respective high density servo track on the magnetic tape; and
use, by the processor, the second lateral position value along with the lateral position value to control the tape head actuator.

16. The computer program product as presented in claim 15, the program instructions executable by the processor to cause the processor to:
receive, by the processor, signals corresponding to windows of a third servo pattern from a third servo channel;
calculate, by the processor, a lateral position estimate for each of a third number of the windows of the third servo pattern, the third number of the windows of the third servo pattern according to the number of the windows of the servo pattern;
calculate, by the processor, a third lateral position value using the lateral position estimates for the third number of the windows, wherein the third servo pattern is a respective high density servo track on the magnetic tape; and
use, by the processor, the third lateral position value along with the lateral position value and the second lateral position value to control the tape head actuator.

17. The computer program product as presented in claim 10, the program instructions executable by the processor to cause the processor to:
calculate, by the processor, an operating frequency of a track-following control loop using a current speed of a magnetic tape and the length of the window; and
apply, by the processor, the operating frequency to the track-following control loop.

18. The computer program product as presented in claim 10, the program instructions executable by the processor to cause the processor to:
receive, by the processor, additional estimates from the servo channel;
calculate, by the processor, a supplemental value using the received additional estimates; and
use, by the processor, the supplemental value to control a tape head actuator,
wherein the supplemental value is selected from a group consisting of: a current speed of a magnetic tape, and a magnetic tape skew value.

19. A tape drive, comprising:
a controller comprising logic integrated with and/or executable by the controller to cause the controller to:
determine a length of a window of a servo pattern to use for calculating a lateral position estimate;
determine a number of the windows of the servo pattern to use for calculating a lateral position value;
receive signals corresponding to each of the number of the windows of the servo pattern from a single servo channel;
calculate a lateral position estimate for each of the number of the windows of the servo pattern;
calculate the lateral position value by using the lateral position estimates; and
use the lateral position value to control a tape head actuator.

20. The tape drive as presented in claim 19, the logic integrated with and/or executable by the controller to cause the controller to:
receive signals corresponding to windows of a second servo pattern from a second servo channel;
calculate a lateral position estimate for each of a second number of the windows of the second servo pattern, the second number of the windows of the second servo pattern according to the number of the windows of the servo pattern;
calculate a second lateral position value using the lateral position estimates for the second number of the windows, wherein the servo pattern is a high density servo track on a magnetic tape, wherein the second servo pattern is a respective high density servo track on the magnetic tape;
use the second lateral position value along with the lateral position value to control the tape head actuator;
calculate an operating frequency of a track-following control loop using a current speed of a magnetic tape and the length of the window;
apply the operating frequency to the track-following control loop; and
determine a current speed of a magnetic tape,
wherein determining the number of the windows of the servo pattern is based on the current speed of the magnetic tape,
wherein the servo pattern is a high density servo track on a magnetic tape.

\* \* \* \* \*